United States Patent
Ioannou et al.

(10) Patent No.: US 11,151,053 B2
(45) Date of Patent: Oct. 19, 2021

(54) INCREASING DATA READ AND/OR WRITE HEAT TRACKING RESOLUTION IN STORAGE DEVICES HAVING CACHE ARCHITECTURE

(71) Applicant: International Business Machines Corporation, Armonk, NY (US)

(72) Inventors: Nikolas Ioannou, Zurich (CH); Nikolaos Papandreou, Thalwil (CH); Roman Alexander Pletka, Uster (CH); Sasa Tomic, Kilchberg (CH); Radu Ioan Stoica, Zurich (CH); Timothy Fisher, Cypress, TX (US); Aaron Daniel Fry, Richmond, TX (US); Charalampos Pozidis, Thalwil (CH); Andrew D. Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 62 days.

(21) Appl. No.: 16/534,834

(22) Filed: Aug. 7, 2019

(65) Prior Publication Data
US 2021/0042239 A1 Feb. 11, 2021

(51) Int. Cl.
*G06F 12/1018* (2016.01)
*G06F 12/0891* (2016.01)
(Continued)

(52) U.S. Cl.
CPC ........ *G06F 12/1018* (2013.01); *G06F 3/0622* (2013.01); *G06F 3/0659* (2013.01);
(Continued)

(58) Field of Classification Search
CPC ............ G06F 12/1018; G06F 12/0891; G06F 3/0622; G06F 3/0689; G06F 12/0246;
(Continued)

(56) References Cited

U.S. PATENT DOCUMENTS 9,251,909 B1  2/2016  Camp et al.
9,496,043 B1  11/2016 Camp et al.
(Continued)

OTHER PUBLICATIONS

Pletka et al., "Health-Binning: Maximizing the Performance and the Endurance of Consumer-Level NAND Flash," ACM, SYSTOR '16, Jun. 6-8, 2016, 10 pages.
(Continued)

*Primary Examiner* — Hong C Kim
(74) *Attorney, Agent, or Firm* — Zilka-Kotab, P.C.

(57) ABSTRACT

A computer-implemented method, according to one embodiment, is for maintaining heat information of data while in a cache. The computer-implemented method includes: transferring data from non-volatile memory to the cache, such that the data is stored in a first page in the cache. Previous read and/or write heat information associated with the data is maintained by preserving one or more bits in a hash table which correspond to the data in the first page. Moreover, the data is destaged from the first page in the cache to the non-volatile memory, and the one or more bits in the hash table which correspond to the data are updated to reflect current read and/or write heat information associated with the data.

20 Claims, 13 Drawing Sheets

(51) Int. Cl.
*G06F 12/02* (2006.01)
*G06F 3/06* (2006.01)
(52) U.S. Cl.
CPC .......... *G06F 3/0679* (2013.01); *G06F 3/0689* (2013.01); *G06F 12/0246* (2013.01); *G06F 12/0253* (2013.01); *G06F 12/0891* (2013.01)
(58) Field of Classification Search
CPC .. G06F 12/0253; G06F 3/0659; G06F 3/0679; G06F 3/061; G06F 3/0656; G06F 3/0652; G06F 3/0614; G06F 3/0619; G06F 12/0866; G06F 11/108
USPC ......... 711/154, 103, 118, 206; 714/704, 773
See application file for complete search history.

(56) References Cited

U.S. PATENT DOCUMENTS

| | | | | |
|---|---|---|---|---|
| 10,008,250 | B2 | 6/2018 | Ramalingam | |
| 10,078,582 | B2 | 9/2018 | Camp et al. | |
| 2008/0114930 | A1* | 5/2008 | Sanvido | G06F 12/0866 711/113 |
| 2013/0111133 | A1* | 5/2013 | Benhase | G06F 12/0897 711/122 |
| 2014/0223094 | A1* | 8/2014 | Baderdinni | G06F 3/0647 711/114 |
| 2015/0177995 | A1* | 6/2015 | Camp | G06F 12/0246 711/103 |
| 2016/0179678 | A1* | 6/2016 | Camp | G06F 12/0855 711/103 |
| 2016/0274802 | A1* | 9/2016 | Koo | G06F 3/0659 |
| 2017/0075812 | A1* | 3/2017 | Wu | G06F 12/0246 |
| 2018/0314630 | A1* | 11/2018 | Camp | G06F 12/0246 |
| 2019/0272232 | A1* | 9/2019 | Camp | G06F 12/0855 |

OTHER PUBLICATIONS

Xu et al., "Flash-Aware Page Replacement Algorithm," Hindawi Publishing Corporation, Mathematical Problems in Engineering, vol. 2014, Article ID 136246, Aug. 12, 2014, pp. 1-11.
Huang et al., "Improving Flash-based Disk Cache with Lazy Adaptive Replacement," IEEE, 2013, 10 pages, retrieved from http://storageconference.us/2013/Papers/2013.Paper.28.pdf.
Fan et al., "Extending SSD Lifespan with Comprehensive Non-Volatile Memory-Based Write Buffers," Journal of Computer Science and Technology, vol. 34, No. 1, Jan. 2019, pp. 113-132.
Yu Hu et al., "Container Marking: Combining Data Placement, Garbage Collection and Wear Levelling for Flash," 19th Annual IEEE/ACM International Symposium on Modeling, Analysis and Simulation of Computer and telecommunication Systems, Jul. 2011, 13 pages, retrieved from https://www.researchgate.net/publication/221082227_Container_Marking_Combining_Data_Placement_Garbage_Collection_and_Wear_Levelling_for_Flash.
Patterson et al., "A Case for Redundant Arrays of Inexpensive Disks (RAID)," Reprint from Proceedings of the ACM SIGMOD International Conference on Management of Data, Jun. 1988, pp. 3-14.
Pletka et al., U.S. Appl. No. 16/508,140, filed Jul. 10, 2019.

* cited by examiner

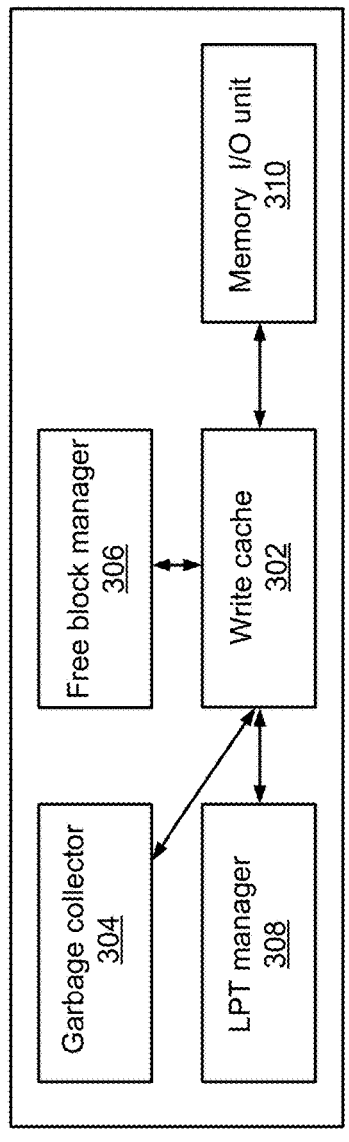
FIG. 3
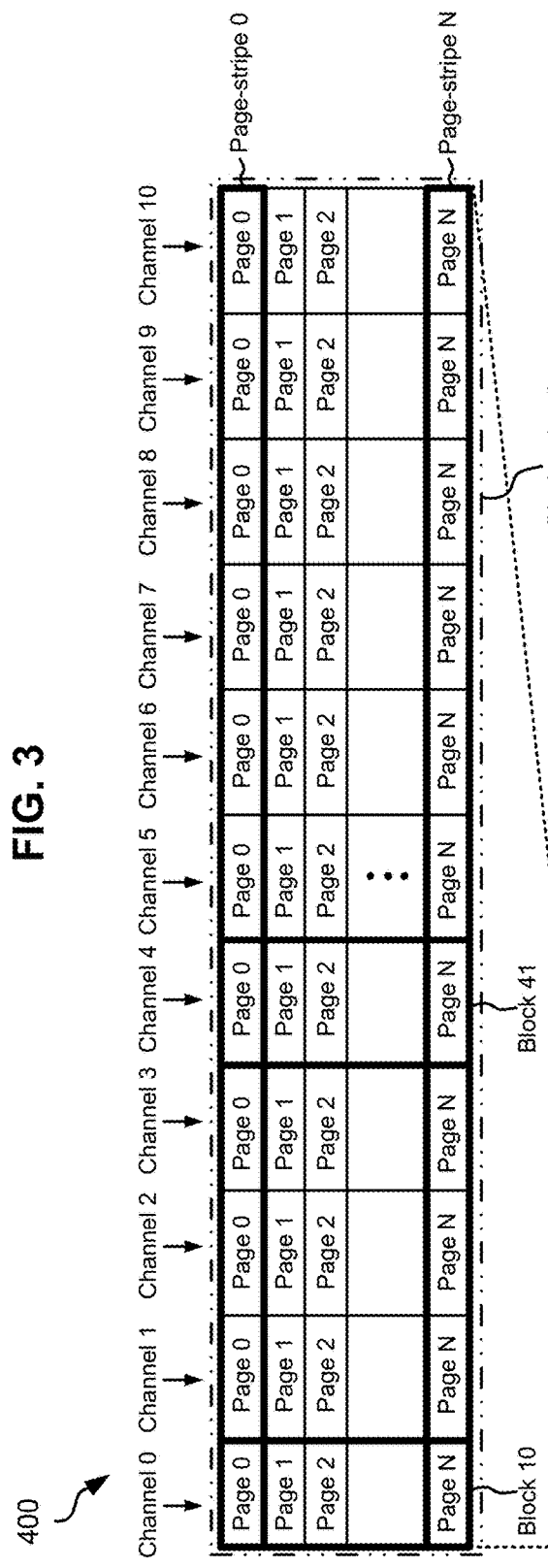
FIG. 4
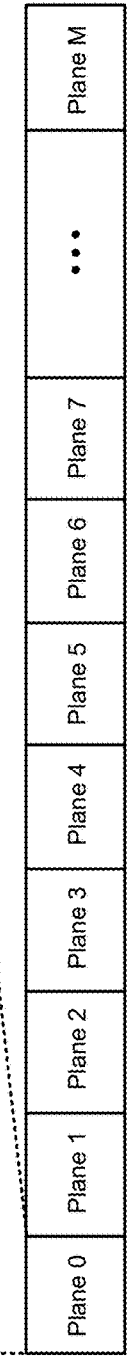

INCREASING DATA READ AND/OR WRITE HEAT TRACKING RESOLUTION IN STORAGE DEVICES HAVING CACHE ARCHITECTURE

BACKGROUND

The present invention relates to data storage systems, and more particularly, this invention relates to preserving data heat information and increasing data heat tracking resolution.

Using Flash memory as an example, the performance characteristics of conventional NAND Flash-based solid state drives (SSDs) are fundamentally different from those of traditional hard disk drives (HDDs). Data in conventional SSDs is typically organized in pages of 4, 8, or 16 KB sizes. Moreover, page read operations in SSDs are typically one order of magnitude faster than write operations and latency neither depends on the current nor the previous location of operations.

However, in Flash-based SSDs, memory locations are erased in blocks prior to being written to. The size of an erase block unit is typically 256 pages and the erase operation takes approximately one order of magnitude more time than a page program operation. Due to the intrinsic properties of NAND Flash, Flash-based SSDs write data out-of-place whereby a mapping table maps logical addresses of the written data to physical ones. This mapping table is typically referred to as the Logical-to-Physical Table (LPT).

As Flash-based memory cells exhibit read errors and/or failures due to wear or other reasons, additional redundancy may be used within memory pages as well as across memory chips (e.g., RAID-5 and RAID-6 like schemes). The additional redundancy within memory pages may include error correction code (ECC) which, for example, may include BCH codes. While the addition of ECC in pages is relatively straightforward, the organization of memory blocks into RAID-like stripes is more complex. For instance, individual blocks are retired over time which requires either reorganization of the stripes, or capacity reduction of the stripe. As the organization of stripes together with the LPT defines the placement of data, SSDs typically utilize a Log-Structured Array (LSA) architecture, which combines these two methods.

The LSA architecture relies on out-of-place writes. In this approach, a memory page overwrite will result in writing the memory page data to a new location in memory, marking the old copy of the memory page data as invalid, and then updating the mapping information. Due to the limitations of current NAND memory technology, an invalidated data location cannot be reused until the entire block it belongs to has been erased. Before erasing, though, the block undergoes garbage collection, whereby any valid data in the block is relocated to a new block. Garbage collection of a block is typically deferred for as long as possible to maximize the amount of invalidated data in block, and thus reduce the number of valid pages that are relocated, as relocating data causes additional write operations, and thereby increases write amplification.

SUMMARY

A computer-implemented method, according to one embodiment, is for maintaining heat information of data while in a cache. The computer-implemented method includes: transferring data from non-volatile memory to the cache, such that the data is stored in a first page in the cache. Previous read and/or write heat information associated with the data is maintained by preserving one or more bits in a hash table which correspond to the data in the first page. Moreover, the data is destaged from the first page in the cache to the non-volatile memory, and the one or more bits in the hash table which correspond to the data are updated to reflect current read and/or write heat information associated with the data.

A computer program product, according to another embodiment, includes a computer readable storage medium having program instructions embodied therewith. The program instructions are readable and/or executable by a processor to cause the processor to: perform the foregoing method.

A computer-implemented method, according to yet another embodiment, is for maintaining heat information of data while in a cache. The computer-implemented method includes: updating one or more bits in a hash table which correspond to data to reflect current read and/or write heat information corresponding to the data. The data is transferred from non-volatile memory to the cache, such that the data is stored in a first page in the cache. The current read and/or write heat information which corresponds to the data is further maintained by preserving the one or more bits in the hash table which correspond to the data. Moreover, the data is destaged from the first page in the cache to the non-volatile memory.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 3 is a system diagram, in accordance with one embodiment.

FIG. 4 is a conceptual diagram which includes a block-stripe and page-stripe, in accordance with one embodiment.

DETAILED DESCRIPTION

Figure 1:
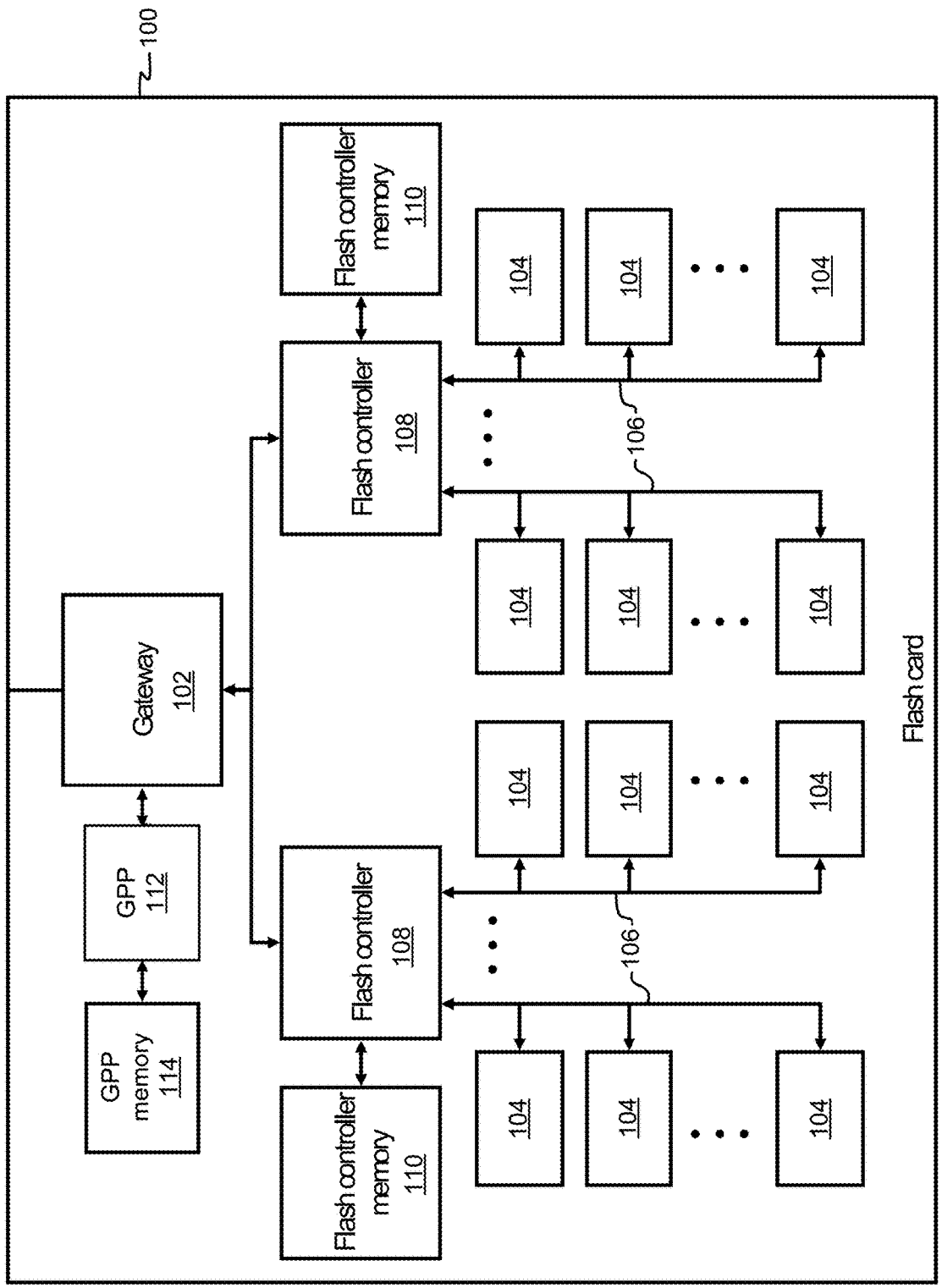
FIG. 1 is a diagram of a non-volatile memory card, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of data storage systems, as well as operation and/or component parts thereof. It should be appreciated that various embodiments herein can be implemented with a wide range of memory mediums, including for example non-volatile random access memory (NVRAM) technologies such as NAND Flash memory, NOR Flash memory, phase-change memory (PCM), magnetoresistive RAM (MRAM) and resistive RAM (RRAM). To provide a context, and solely to assist the reader, various embodiments may be described with reference to a type of non-volatile memory. This has been done by way of example only, and should not be deemed limiting on the invention defined in the claims.

In one general embodiment, a computer-implemented method is for maintaining heat information of data while in a cache. The computer-implemented method includes: transferring data from non-volatile memory to the cache, such that the data is stored in a first page in the cache. Previous read and/or write heat information associated with the data is maintained by preserving one or more bits in a hash table which correspond to the data in the first page. Moreover, the data is destaged from the first page in the cache to the non-volatile memory, and the one or more bits in the hash table which correspond to the data are updated to reflect current read and/or write heat information associated with the data.

In another general embodiment, a computer program product includes a computer readable storage medium having program instructions embodied therewith. The program instructions are readable and/or executable by a processor to cause the processor to: perform the foregoing method.

In yet another general embodiment, a computer-implemented method is for maintaining heat information of data while in a cache. The computer-implemented method includes: updating one or more bits in a hash table which correspond to data to reflect current read and/or write heat information corresponding to the data. The data is transferred from non-volatile memory to the cache, such that the data is stored in a first page in the cache. The current read and/or write heat information which corresponds to the data is further maintained by preserving the one or more bits in the hash table which correspond to the data. Moreover, the data is destaged from the first page in the cache to the non-volatile memory.

FIG. 1 illustrates a memory card 100, in accordance with one embodiment. It should be noted that although memory card 100 is depicted as an exemplary non-volatile data storage card in the present embodiment, various other types of non-volatile data storage cards may be used in a data storage system according to alternate embodiments. It follows that the architecture and/or components of memory card 100 are in no way intended to limit the invention, but rather have been presented as a non-limiting example.

Moreover, as an option, the present memory card 100 may be implemented in conjunction with features from any other embodiment listed herein, such as those described with reference to the other FIGS. However, such memory card 100 and others presented herein may be used in various applications and/or in permutations which may or may not be specifically described in the illustrative embodiments listed herein. Further, the memory card 100 presented herein may be used in any desired environment.

With continued reference to FIG. 1, memory card 100 includes a gateway 102, a general purpose processor (GPP) 112 (such as an ASIC, FPGA, CPU, etc.) connected to a GPP memory 114 (which may comprise RAM, ROM, battery-backed DRAM, phase-change memory PC-RAM, MRAM, STT-MRAM, etc., or a combination thereof), and a number of memory controllers 108, which include Flash controllers in the present example. Each memory controller 108 is connected to a plurality of NVRAM memory modules 104 (which may comprise NAND Flash or other non-volatile memory type(s) such as those listed above) via channels 106.

According to various embodiments, one or more of the controllers 108 may be or include one or more processors, and/or any logic for controlling any subsystem of the memory card 100. For example, the controllers 108 typically control the functions of NVRAM memory modules 104 such as, data writing, data recirculation, data reading, etc. The controllers 108 may operate using logic known in the art, as well as any logic disclosed herein, and thus may be considered as a processor for any of the descriptions of non-volatile memory included herein, in various embodiments.

Moreover, the controller 108 may be configured and/or programmable to perform or control some or all of the methodology presented herein. Thus, the controller 108 may be considered to be configured to perform various operations by way of logic programmed into one or more chips, modules, and/or blocks; software, firmware, and/or other instructions being available to one or more processors; etc., and combinations thereof.

Referring still to FIG. 1, each memory controller 108 is also connected to a controller memory 110 which preferably includes a cache which replicates a non-volatile memory structure according to the various embodiments described herein. However, depending on the desired embodiment, the controller memory 110 may be battery-backed DRAM, phase-change memory PC-RAM, MRAM, STT-MRAM, etc., or a combination thereof.

Figure 2:
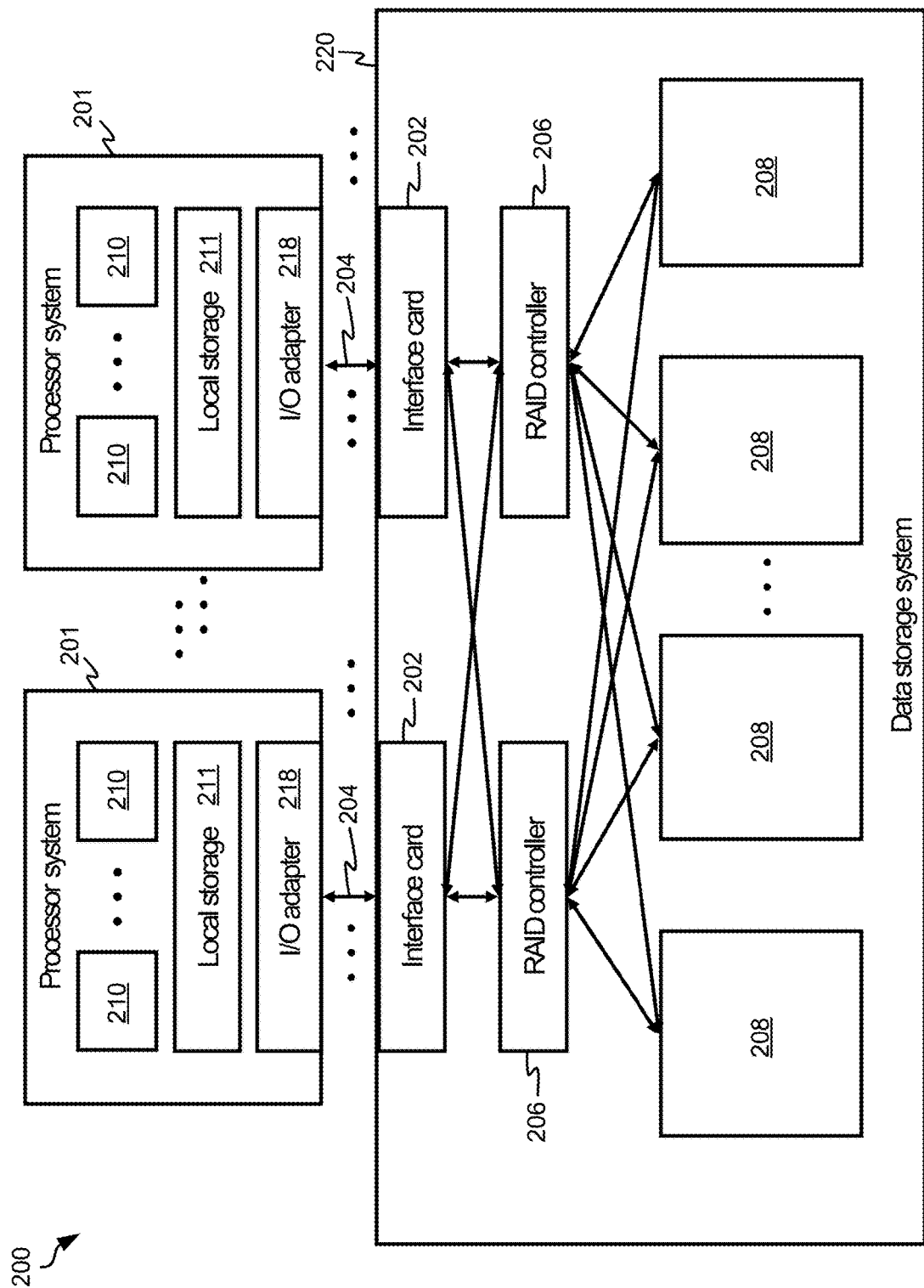
FIG. 2 is a diagram of a data storage system architecture, in accordance with one embodiment.

As previously mentioned, memory card 100 may be implemented in various types of data storage systems, depending on the desired embodiment. FIG. 2 illustrates a data storage system architecture 200 according to an exemplary embodiment which is in no way intended to limit the invention. Moreover, it should be noted that the data storage system 220 of FIG. 2 may include various components found in the embodiment of FIG. 1.

Looking to FIG. 2, the data storage system 220 comprises a number of interface cards 202 configured to communicate via I/O interconnections 204 to one or more processor systems 201. The data storage system 220 may also comprise one or more RAID controllers 206 configured to control data storage in a plurality of non-volatile data storage cards 208. The non-volatile data storage cards 208 may comprise NVRAM, Flash memory cards, RAM, ROM, and/or some other known type of non-volatile memory.

The I/O interconnections 204 may include any known communication protocols, such as Fiber Channel (FC), FC over Ethernet (FCoE), Infiniband, Internet Small Computer System Interface (iSCSI), Transport Control Protocol/Internet Protocol (TCP/IP), Peripheral Component Interconnect Express (PCIe), etc., and/or any combination thereof.

The RAID controller(s) 206 in the data storage system 220 may perform a parity scheme similar to that employed by RAID-5, RAID-10, or some other suitable parity scheme, as would be understood by one of skill in the art upon reading the present descriptions.

Each processor system 201 comprises one or more processors 210 (such as CPUs, microprocessors, etc.), local data storage 211 (e.g., such as RAM 1014 of FIG. 10, ROM 1016 of FIG. 10, etc.), and an I/O adapter 218 configured to communicate with the data storage system 220.

Referring again to FIG. 1, memory controllers 108 and/or other controllers described herein (e.g., RAID controllers 206 of FIG. 2) may be able to perform various functions on stored data, depending on the desired embodiment. Specifically, memory controllers may include logic configured to perform any one or more of the following functions, which are in no way intended to be an exclusive list. In other words, depending on the desired embodiment, logic of a storage system may be configured to perform additional or alternative functions, as would be appreciated by one skilled in the art upon reading the present description.

Garbage Collection

Garbage collection in the context of SSD memory controllers of the present description may include the process of identifying blocks of data to be reclaimed for future usage and relocating all pages that are still valid therein. Moreover, depending on the specific controller and/or the respective garbage collection unit of operation, LEBs may be identified for being reclaimed and/or relocated. Typically, one LEB corresponds to one block stripe, but alternative implementations may consider a fixed number of block stripes building a LEB as well.

A physical "block" represents a minimal unit that may be erased on non-volatile memory, e.g., such as NAND Flash memory, and thereby prepared for writing data thereto. However, a typical garbage collection unit of operation is often a multiple of the physical blocks of non-volatile memory, and is also referred to herein as a LEB. This is due to the fact that typically RAID-like parity information is added in LEBs. Therefore, in case of a page or block failure data can only be rebuilt when all blocks in the LEB are still holding data. Accordingly, the individual blocks from the garbage collection unit can only be erased either individually or in a single unit once all still valid data from all blocks in the LEB has been relocated successfully to new locations. Hence, the full garbage collection units are garbage-collected as a single unit. Moreover, the size of the LEB directly affects the garbage collection induced write amplification. The larger the LEB, the more likely it becomes that unrelated data are stored together in the LEB, and therefore more of the LEB data may have to be relocated upon garbage collection selection.

Frequently, blocks from different dies and/or flash channels are grouped together, such that blocks from the same group can be read or written in parallel, thereby increasing overall bandwidth. It is also possible to combine the previous two methods, and to compose RAID stripes using blocks from different flash channels that can be accessed in parallel.

It should also be noted that an LEB may include any multiple of the physical memory block, which is a unit of physical erasure. Moreover, the organization of memory blocks into LEB s not only allows for adding RAID-like parity protection schemes among memory blocks from different memory chips, memory planes and/or channels but also allows for significantly enhancing performance through higher parallelism. For instance, multiple non-volatile memory blocks may be grouped together in a RAID stripe. As will be appreciated by one skilled in the art upon reading the present description, RAID schemes generally improve reliability and reduce the probability of data loss.

According to an exemplary embodiment, which is in no way intended to limit the invention, memory controllers (e.g., see 108 of FIG. 1) may internally perform a garbage collection. As previously mentioned, the garbage collection may include selecting a LEB to be relocated, after which all data that is still valid on the selected LEB may be relocated (e.g., moved). After the still valid data has been relocated, the LEB may be erased and thereafter, used for storing new data. The amount of data relocated from the garbage collected LEB determines the write amplification. Moreover, an efficient way to reduce the write amplification includes implementing heat-based data separation.

Heat-Based Data Separation

In the present context, the "write heat" of data refers to the rate (e.g., frequency) at which the data is updated (e.g., rewritten with new data). Memory blocks that are considered "hot" tend to have a frequent updated rate, while memory blocks that are considered "cold" have an update rate slower than hot blocks.

Tracking the write heat of a logical page may involve, for instance, allocating a certain number of bits in the LPT mapping entry for the page to keep track of how many write operations the page has seen in a certain time period or window. Typically, host write operations increase the write heat whereas internal relocation writes decrease the write heat. The actual increments and/or decrements to the write heat may be deterministic or probabilistic.

Similarly, "read heat" may be tracked with a certain number of additional bits in the LPT for each logical page. To reduce meta-data, read heat can also be tracked at a physical block level where separate counters per block for straddling and non-straddling reads can be maintained. However, it should be noted that the number of read requests to and/or read operations performed on a memory block may not come into play for heat-based data separation when determining the heat of the memory block for some embodiments. For example, if data is frequently read from a particular memory block, the high read frequency does not necessarily mean that memory block will also have a high update rate. Rather, a high frequency of read operations performed on a given memory block may denote an importance, value, etc. of the data stored in the memory block.

By grouping memory blocks of the same and/or similar write heat values, heat-based data separation may be achieved. In particular, heat-based data separation methods may group hot memory pages together in certain memory blocks while cold memory pages are grouped together in separate memory blocks. Thus, under a heat-base data separation scheme, an LEB tends to be occupied by either hot or cold data.

The merit of separating data based on heat information is three-fold. First, performing a garbage collection process on a hot memory block will prevent triggering the relocation of write-cold data as well. In the absence of heat-based data separation, updates to write-hot data, which are performed frequently, also results in the undesirable relocations of all cold data collocated on the same LEB as the hot data being relocated. Therefore, the write amplification incurred by performing garbage collection is much lower for embodiments implementing heat-based data separation.

Secondly, the relative write-heat of data can be utilized for wear leveling purposes. For example, write-hot data may be placed in healthier (e.g., younger) memory blocks, while write-cold data may be placed on less healthy (e.g., older) memory blocks relative to those healthier memory blocks. Thus, the rate at which relatively older blocks are exposed to wear is effectively slowed, thereby improving the overall endurance of a given data storage system implementing heat-based data separation.

Thirdly, the relative read heat of data can be used to proactively place them on faster media in a multi-tier flash storage system (e.g., Single-bit-per-cell, two-bit-per-cell, three-bit-per-cell, quad-bit-per-cell NAND pages), thereby increasing the performance of the system (e.g., reduce read latency).

Write Allocation

Write allocation includes placing data of write operations into free locations of open LEBs. As soon as all pages in a LEB have been written, the LEB is closed and placed in a pool holding occupied LEBs. Typically, LEBs in the occupied pool become eligible for garbage collection. The number of open LEBs is normally limited and any LEB being closed may be replaced, either immediately or after some delay, with a fresh LEB that is being opened.

During runtime, garbage collection may take place concurrently with user write operations. For example, as a user (e.g., a host) writes data to a device, the device controller may continuously perform garbage collection on LEBs with invalid data to make space for the new incoming data pages. As mentioned above, the LEBs having the garbage collection being performed thereon will often have some pages that are still valid at the time of the garbage collection operation; thus, these pages are preferably relocated (e.g., written) to a new LEB.

Again, the foregoing functions are in no way intended to limit the capabilities of any of the storage systems described and/or suggested herein. Rather, the aforementioned functions are presented by way of example, and depending on the desired embodiment, logic of a storage system may be configured to perform additional or alternative functions, as would be appreciated by one skilled in the art upon reading the present description.

Referring now to FIG. 3, a system 300 is illustrated in accordance with one embodiment. As an option, the present system 300 may be implemented in conjunction with features from any other embodiment listed herein, such as those described with reference to the other FIGS. However, such system 300 and others presented herein may be used in various applications and/or in permutations which may or may not be specifically described in the illustrative embodiments listed herein. Further, the system 300 presented herein may be used in any desired environment, e.g., in combination with a controller.

As illustrated, system 300 includes a write cache 302 which is coupled to several other components, including garbage collector 304. As previously mentioned, garbage collector 304 may be used to free LEB units by relocating valid data and providing non-volatile memory blocks to be erased for later reuse. Thus, the garbage collector 304 may reclaim blocks of consecutive physical space, depending on the desired embodiment. According to an exemplary embodiment, block erase units may be used to keep track of and/or complete the erase of non-volatile memory blocks handed over by the garbage collector 304.

Write cache 302 is also coupled to free block manager 306 which may keep track of free non-volatile memory blocks after they have been erased. Moreover, as would be appreciated by one of ordinary skill in the art upon reading the present description, the free block manager 306 may build free stripes of non-volatile memory blocks from different lanes (e.g., block-stripes) using the erased free non-volatile memory blocks.

Referring still to FIG. 3, write cache 302 is coupled to LPT manager 308 and memory I/O unit 310. The LPT manager 308 maintains the logical-to-physical mappings of logical addresses to physical pages in memory. According to an example, which is in no way intended to limit the invention, the LPT manager 308 may maintain the logical-to-physical mappings of 4 KiB logical addresses. The memory I/O unit 310 communicates with the memory chips in order to perform low level operations, e.g., such as reading one or more non-volatile memory pages, writing a non-volatile memory page, erasing a non-volatile memory block, etc.

To better understand the distinction between block-stripes and page-stripes as used herein, FIG. 4 is a conceptual diagram 400, in accordance with one embodiment. LEBs are built from block stripes and typically a single block stripe is used to build a LEB. However, alternative embodiments may use multiple block stripes to form an LEB. As an option, the present conceptual diagram 400 may be implemented in conjunction with features from any other embodiment listed herein, such as those described with reference to the other FIGS. However, such conceptual diagram 400 and others presented herein may be used in various applications and/or in permutations which may or may not be specifically described in the illustrative embodiments listed herein. Further, the controller conceptual diagram 400 presented herein may be used in any desired environment. Thus, the exemplary non-volatile memory controller conceptual diagram 400 of FIG. 4 may be implemented in a cache architecture. However, depending on the desired embodiment, the conceptual diagram 400 of FIG. 4 may be implemented in defining the organization of data stored in non-volatile memory. Accordingly, both implementations are described in turn below.

Non-Volatile Memory

Looking now to FIG. 4, the conceptual diagram 400 includes a set of M+1 aggregated planes labeled "Plane 0" through "Plane M". An aggregated plane consists of all physical planes with the same plane index on different channels. It should be noted that aggregated planes are also referred to herein simply as planes.

When implemented with data stored in non-volatile memory, each physical plane on a channel may include a large set of blocks, e.g., typically in the order of 1024, 2048 or more. Moreover, one or more physical planes may also include several additional blocks which may be used as replacement blocks for bad blocks (e.g., blocks performing poorly, blocks having undesirable characteristics, etc.).

In each plane of non-volatile memory, a single block from each channel may form a respective block-stripe. It follows that a number of block-stripes supported by a given embodiment of non-volatile memory may be determined by the number of blocks per plane and the number of planes.

In the exploded view of Plane 0, the conceptual diagram 400 further illustrates a single block-stripe (Block-stripe 0) out of the set of block-stripes supported in the remainder of the planes. Block-stripe 0 of plane 0 is shown as including 11 blocks, one block from each channel labeled "Channel 0" through "Channel 10". It should be noted that the association of blocks to block-stripe can change over time as block-stripes are typically dissolved after they have been garbage collected. Erased blocks may be placed in free block pools, whereby new block-stripes are assembled from blocks in the free block pools when write allocation requests fresh block-stripes. For example, looking to conceptual diagram 400, Block 10 from Channel 0 and Block 41 from Channel 4 are currently associated with the illustrated Block-stripe 0 of Plane 0. Furthermore, the illustrated Block-stripe 0 holds N+1 page-stripes and each block therefore holds N+1 pages labeled "Page 0" through "Page N".

Cache Architecture

Referring still to FIG. 4, each block of pages illustrated in the exploded view of aggregated Plane 0 may constitute a unique block from one channel when implemented in a cache architecture. Similarly, each channel contributes a single, individual block which form a block-stripe. For example, looking to conceptual diagram 400, Block 10 from Channel 0 includes all pages (Page 0 through Page N) therein, while Block 41 from Channel 4 corresponds to all pages therein, and so on.

In the context of a memory controller, e.g., which may be capable of implementing RAID at the channel level, a block-stripe is made up of multiple blocks which amount to a stripe of blocks. Looking still to FIG. 4, the multiple blocks of aggregated Plane 0 constitute Block-stripe 0. While all blocks in a block-stripe typically belong to the same aggregated plane, in some embodiments one or more blocks of a block-stripe may belong to different physical planes. It follows that each aggregated plane may include one or more block-stripe. Thus, according to an illustrative embodiment, Block 0 through Block 10 from different physical planes may constitute a block-stripe.

Regardless of whether the conceptual diagram 400 of FIG. 4 is implemented with non-volatile memory and/or a cache architecture, in different embodiments, the number of pages in each block and/or the number of channels in each plane may vary depending on the desired embodiment. According to an exemplary embodiment, which is in no way intended to limit the invention, a block may include 256 pages, but could include more or fewer in various embodiments. Analogously, the number of channels per plane and/or the number of planes may vary depending on the desired embodiment.

Referring still to FIG. 4, all pages in a block-stripe with the same page index denote a page-stripe. For example, Page-stripe 0 includes the first page (Page 0) of each channel in Block-stripe 0 of Plane 0. Similarly, Page-stripe N includes the last page (Page N) of each channel in Block-stripe 0 of Plane 0.

As previously mentioned, write and/or read heat information may be utilized to implement heat-based data separation by grouping write-hot memory pages together in memory, while write-cold memory pages are grouped together in memory separately, and placing read-hot memory pages on faster media (e.g., in Single-bit-per-cell pages in QLC NAND Flash-based system). This heat-based separation of data improves the operating efficiency of the overarching storage system by decreasing performance delays. These improvements are particularly desirable in view of the changes that storage technology has experienced. Specifically, data storage has experienced a growth in capacity coupled with a proportional decrease in price. One of the key factors in creating this trend is the steady increase in the number of bits that can be stored per cell in memory. Increasing the number of bits per cell allows a proportional increase capacity without fundamentally changing the memory technology and without having to reduce the scale of the cells themselves.

However, these increases to the number of bits that can be stored in each cell have come with drawbacks. Specifically, conventional implementations have experienced declines in the endurance of the flash blocks, while the performance metrics have also degraded. These trends have made the process of designing an efficient non-volatile memory controller increasingly challenging. Conventional non-volatile memory controllers have employed a variety of techniques in an attempt to mask some of these idiosyncrasies. Some of these techniques include advanced error correction codes and dynamically adjusting the threshold voltage levels to reduce read error rate, minimizing internal garbage collection overhead through heat aware data placement algorithms, increasing device endurance by performing wear levelling, etc. Nevertheless, as bit density continues to grow, these techniques alone cannot guarantee an acceptable device lifetime.

In sharp contrast to these conventional shortcomings, some of the embodiments included herein increase the accuracy by which read and/or write heat information is maintained for data stored in non-volatile memory. For instance, some of the approaches included herein are able to maintain read and/or write heat information for data even when it is located in a write cache (e.g., destage buffer). Some of the approaches are also able to increase the resolution of the data read and/or write heat tracking capabilities of a memory device by augmenting the heat tracking information metadata with the location of the data prior to a data store operation, e.g., as will be described in further detail below.

Figure 5:
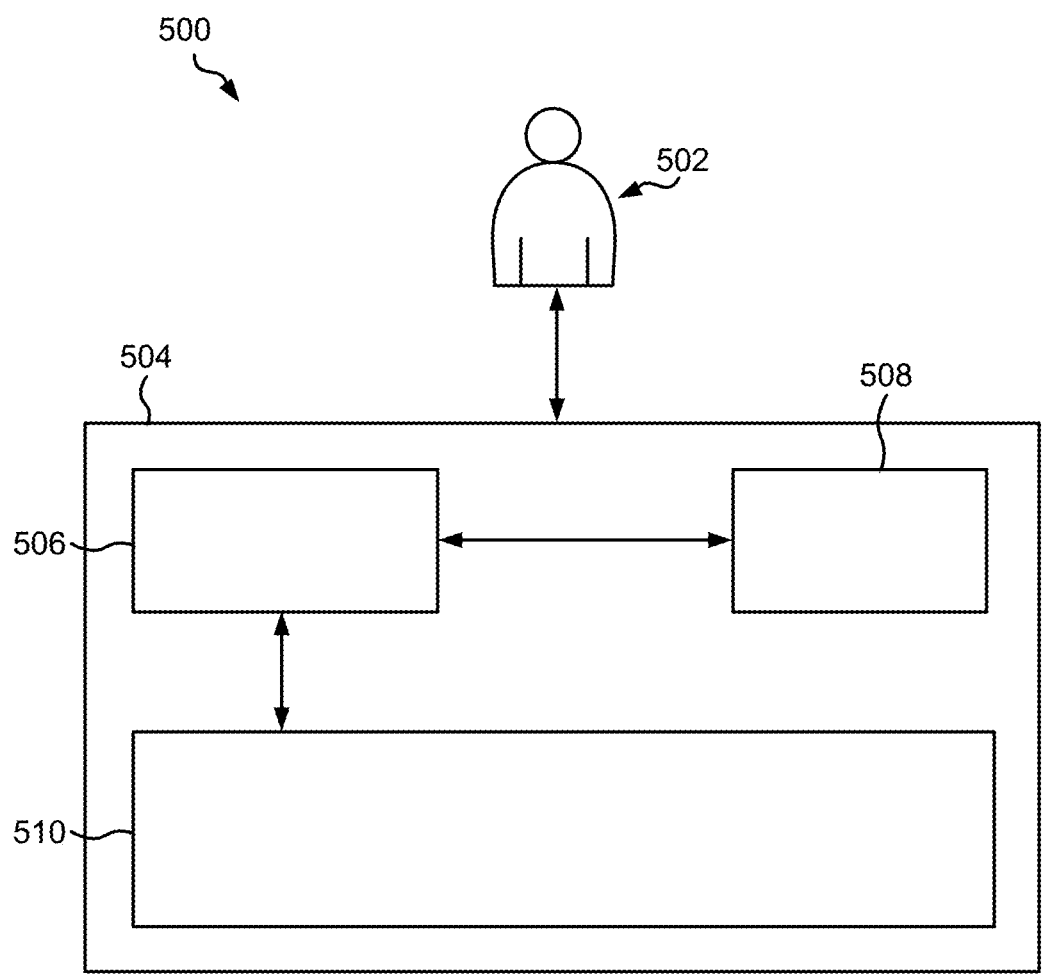
FIG. 5 is a partial representational view of a storage system, in accordance with one embodiment.

Referring now to FIG. 5, a storage system 500 is illustrated in accordance with one embodiment. As an option, the present storage system 500 may be implemented in conjunction with features from any other embodiment listed herein, such as those described with reference to the other FIGS. However, such storage system 500 and others presented herein may be used in various applications and/or in permutations which may or may not be specifically described in the illustrative embodiments listed herein. Further, the storage system 500 presented herein may be used in any desired environment. Thus FIG. 5 (and the other FIGS.) may be deemed to include any possible permutation.

As shown, the storage system includes a memory module 504 which is coupled to a user 502. In other words, information, data, requests, instructions, etc. may be sent between the memory module 504 and the user 502. Depending on the approach, the user 502 may be an administrator, a running application, another memory module, etc., or any other type of user that may wish to write data to, and/or access data in the memory module 504.

The memory module 504 itself includes a controller 506 which is coupled to a cache 508 as well as non-volatile memory 510. According to some approaches, the controller 506 is a hybrid controller capable of reconfiguring memory blocks in the non-volatile memory 510 between different modes. As mentioned above, blocks of memory may be converted by a hybrid controller, e.g., such as the controller 506 in FIG. 5, from single-level-cell (SLC) mode to a multi-bit-per-cell mode (TLC, QLC, etc.) depending on the preferred configuration.

Looking to the cache 508, a cache architecture typically includes cached data (e.g., recently written data) which is maintained in a set of buffers (e.g., destage buffers). These buffers are typically included on a different medium than that of the main memory 510, e.g., as depicted in FIG. 5. The medium used to form the cache 508 buffers is preferably faster, and as a result, typically has a smaller storage capacity compared to the main memory 510. For the duration that data remains in the cache 508 buffers, data access operations performed on that data are served directly from the cache 508. In some approaches, performing data access operations using the cache 508 is achieved by maintaining a cache mapping table which maps logical block addresses (LBAs) to cached pages within cache entries. It follows that the process of accessing a LBA according to the present approach involves first looking to the cache table for the LBA, and falling back to the LPT table if cache lookup results in a miss (e.g., see method 800 in FIG. 8A). However, in other approaches, performing data access operations using the cache 508 is achieved by directly incorporating the cached page locations in an existing LPT (e.g., see method 850 in FIG. 8B). The cached page locations may be incorporated into the existing LPT using unutilized physical block address (PBA) range. It follows that the process of accessing a LBA according to the present approach involves a single table lookup performed using the LPT.

The cache 508 is a write cache (e.g., destage buffer) in some approaches, while in other approaches the cache 508 may serve as a read cache. It follows that the cache 508 may function as a write and/or read cache, e.g., depending on the desired approach, and therefore may be used to temporarily store data specified in one or more data access requests. For instance, in some approaches the cache 508 includes a set of write buffers that hold recently written data. According to an illustrative approach, cache architectures which support heat-based data separation may implement a cache entry which includes "K" page buffers per page stripe (e.g., one per channel), and "L" open page stripes per open block stripe. According to an example which is in no way intended to limit the invention, an implementation having 3 data streams, 32 planes, 11 flash channels, 16 KiB flash pages, and 4 open page-stripes per block-stripe, the total cache capacity may be calculated as 3 data streams×32 planes× cache entry (11 channels×4 flash-pages×16 KiB)=66 MiB.

Figures 6A, 6B:
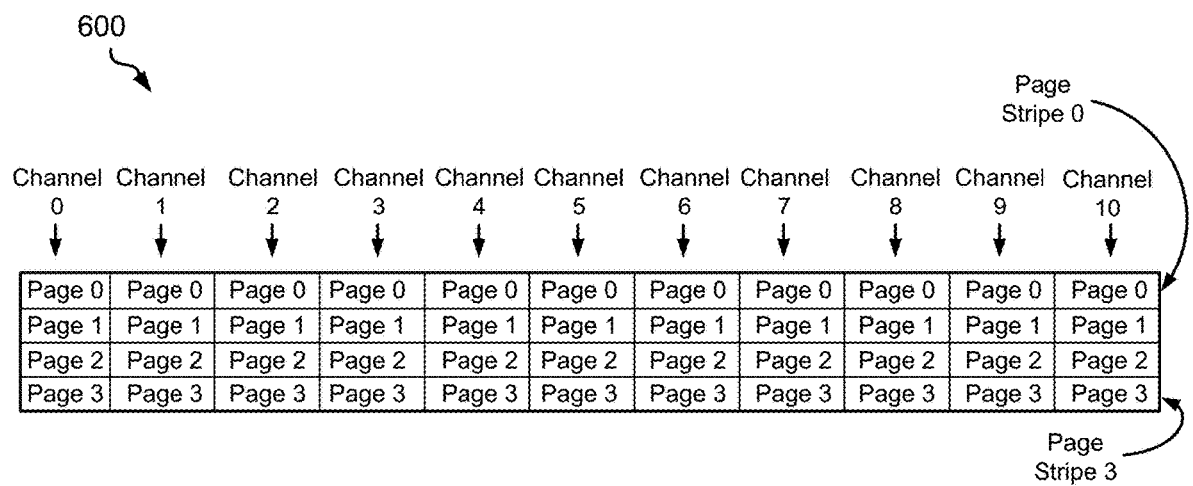
FIG. 6A is a representational view of an exemplary cache entry, in accordance with one embodiment.
FIG. 6B is a representational view of an exemplary logical-to-physical table, in accordance with one embodiment.

For reference, FIG. 6A includes an exemplary cache entry 600 having a size of 66 MiB as described above. The cache entry 600 includes a number of pages which are organized in page stripes and channels as shown. Moreover, FIG. 6B depicts an exemplary LPT 650 which maps a number of LBAs to PBAs. It follows that the LPT 650 is used in some approaches to maintain the logical-to-physical mappings of logical addresses (e.g., at 4 KiB granularity) to physical pages in memory as would be appreciated by one skilled in the art after reading the present description.

Referring back to the memory module 504 of FIG. 5, in preferred approaches the non-volatile memory 510 includes any desired type of non-volatile random access memory, e.g., such as NAND Flash memory, NOR Flash memory, PCM, MRAM, RRAM, etc. However, the non-volatile memory 510 may include any desired type of memory, e.g., such electronic storage devices, magnetic storage devices, optical storage devices, electromagnetic storage devices, semiconductor storage devices, etc.

As data travels between the main memory 510 and the cache 508, write and read heat information corresponding to the data is desirably maintained. As mentioned above, write heat information is desirable in ensuring, for instance, garbage collection efficiency. For example, a garbage collection operation performed on a write-hot memory block will prevent triggering the relocation of write-cold data as well. In contrast, the absence of heat-based data separation undesirably results in frequent updates to hot and cold data alike which is collocated on the same LEB, thereby unnecessarily increasing write amplification. Write and/or read heat information is also desirable in for wear leveling purposes. For example, hot data may be placed in healthier (e.g., younger) memory blocks, while cold data may be placed on less healthy (e.g., older) memory blocks relative to those healthier memory blocks. Thus, the rate at which relatively older blocks are exposed to wear is effectively slowed, thereby improving the overall endurance of a given data storage system implementing heat-based data separation. Read heat information is desirable in ensuring placement of read-hot data to on faster media (e.g., SLC or MLC pages in QLC NAND Flash) in a, for example, multi-tier flash storage system, thus improving system performance.

It follows that write and/or read heat information is preferably maintained for data while it exists in the memory module 504. While maintaining write and/or read heat information for data in the main memory 510 is relatively straightforward, storage systems have previously been unable to continue updating write and/or read heat information for data while it is in cache. As a result, previous systems have suffered from significant dips in heat information availability. However, in sharp contrast to these conventional shortcomings, various ones of the embodiments included herein augment cache architectures with support for read and/or write heat-based data separation. Some of the embodiments described herein are thereby able to efficiently preserve read and write heat information for the lifetime of the data in the cache, as well as augment the granularities at which read and write heat is being tracked without using additional metadata, e.g., as will soon become apparent.

Figure 7A:
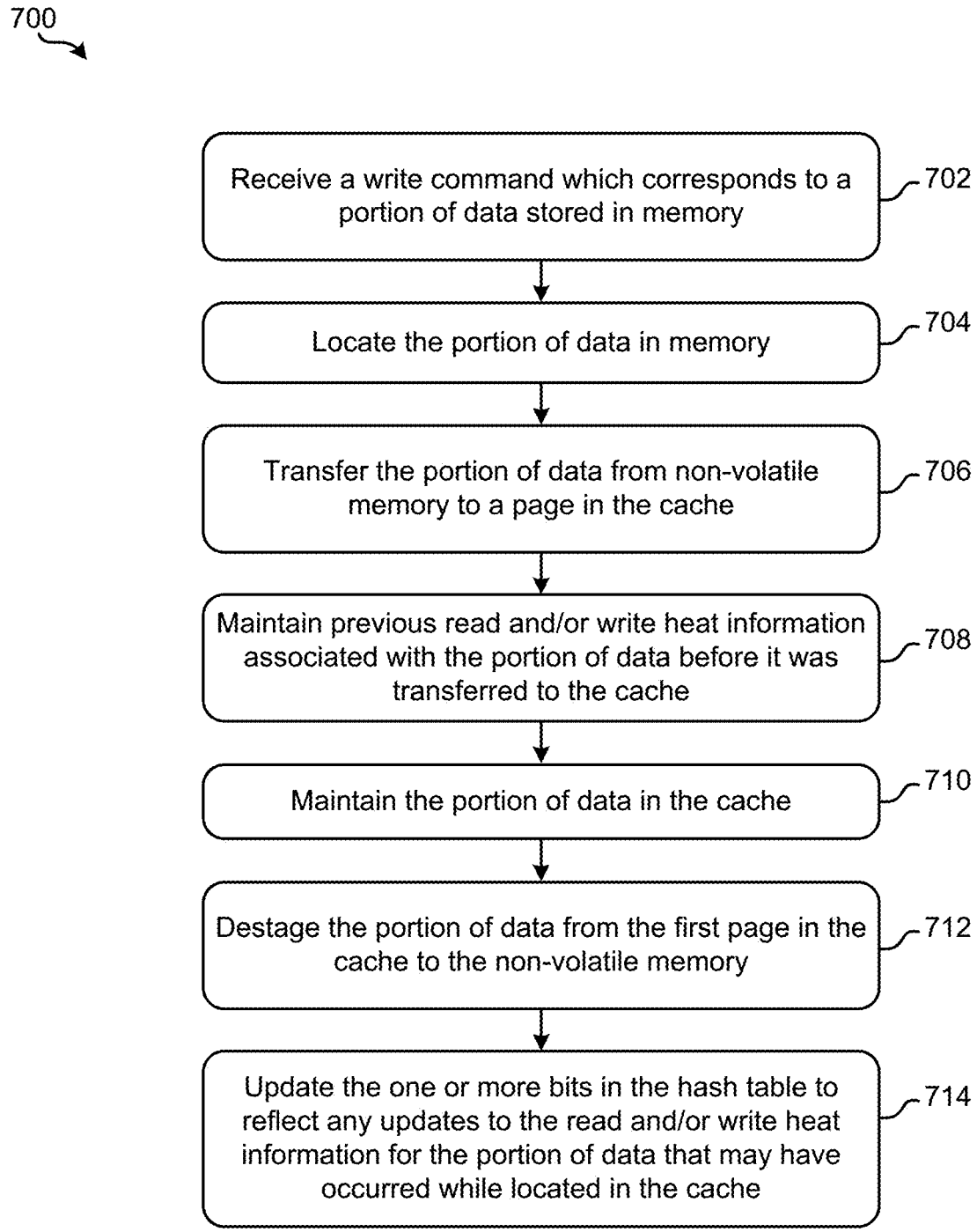
FIG. 7A is a flowchart of a method, in accordance with one embodiment.

Looking now to FIG. 7A, a flowchart of a method 700 for maintaining heat information of data while in a cache is shown according to one embodiment. The method 700 may be performed in accordance with the present invention in any of the environments depicted in FIGS. 1-6B, among others, in various embodiments. Of course, more or less operations than those specifically described in FIG. 7A may be included in method 700, as would be understood by one of skill in the art upon reading the present descriptions.

Each of the steps of the method 700 may be performed by any suitable component of the operating environment. For example, in various embodiments, the method 700 may be partially or entirely performed by a controller, a processor, a computer, etc., or some other device having one or more processors therein. Thus, in some embodiments, method 700 may be a computer-implemented method. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module (s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7A, operation 702 of method 700 includes receiving a write command which corresponds to a portion of data stored in memory. The write command may be an update which involves updating some or all of the portion of data specified therein. Accordingly, operation 704 includes locating the portion of data in memory, and operation 706 includes transferring the portion of data from non-volatile memory (e.g., NAND Flash) to a page in the cache.

Because the write command received in operation 702 involves performing a write operation on the portion of data, it follows that at least the write heat associated therewith has increased (or will increase) as a result. Similarly, read operations received over time will increase the read heat associated with the portions of data which they correspond to. The process of updating the read and/or write heat of a particular portion of data in cache may differ depending on the desired approach. For instance, in some approaches the read and/or write heat which corresponds to the data is updated before the data is even transferred to the cache and maintained while the data remains in the cache (e.g., see method 750 in FIG. 7C below).

However, in other approaches, the read and/or write heat information associated with the portion of data is preferably maintained until after the data has been transferred to the cache. Accordingly, operation 708 includes maintaining previous read and/or write heat information associated with the portion of data before it was transferred to the cache. The read and/or write heat information for a given portion of data may be maintained in one or more bits. These one or more bits are implemented in a hash table which is integrated in the cache architecture in some approaches. In other approaches, the bits may be implemented in a main table. Accordingly, the one or more bits which correspond to each portion of data may be maintained over the lifetime of the data, e.g., regardless of where the data is stored in the memory module.

In other words, the cache architecture is augmented with a metadata entry for each page of data in the cache, each metadata entry including the read and/or write heat information for the respective page of data. According to an example, which is in no way intended to limit the invention, a memory module implementing a read heat-based data separation scheme having 4 different read heat levels may utilize 2 bits for each page in the cache. These 2 bits would thereby be able to store the read heat level information for the respective page in the cache. Similarly, a memory module implementing a write heat-based data separation scheme having 2 different write heat levels may utilize 1 bit for each page in the cache. This 1 bit would thereby be able to store the write heat level information for the respective page in the cache. Situations in which the read and write heat information is maintained for each page in cache may implement the 2 read heat bits as well as the 1 write heat bit, thereby resulting in 3 bits of information being maintained for each page in the cache.

Referring still to FIG. 7A, method 700 further includes maintaining the portion of data in the cache. See operation 710. Data in the cache is maintained in a first-in-first-out manner in some approaches. Accordingly, a portion of data that is transferred to the cache may remain in the cache until it is replaced by other portions of data which are added to the cache over time. However, the cache may be managed according to any other replacement policies, e.g., such as a last-in-first-out policy, a least recently used policy, etc. It follows that while the portion of data remains in the cache, read and write requests that are received, and which correspond to the portion of data, are preferably performed using the cache. As noted above, the data storage mediums used to form cache buffers is typically faster than that used to form the main memory. Satisfying read and/or write requests using the cache when possible thereby desirably increases efficiency by decreasing performance delays.

In response to determining that the portion of data should be removed from the cache and returned to the main memory (e.g., according to any replacement policy), method 700 proceeds to operation 712. There, operation 712 includes destaging the portion of data from the first page in the cache to the non-volatile memory. The portion of data may be destaged to different locations in the non-volatile memory depending on the given approach. For instance, in some approaches the portion of data is destaged to one or more pages in the non-volatile memory which are configured in a mode which is best suited for the current read and/or write heat information which corresponds to the portion of data.

As mentioned above, in some approaches each block of memory may be configured in different modes as desired. Each mode in which a block of memory may be configured are able to achieve different performance characteristics which may be beneficial for certain situations. For example, a page in a block of memory that is configured in SLC mode is able to achieve faster read and/or write performance compared to a page in a block of memory that is configured in a multi-bit-per-cell mode. Further still, the different pages (e.g., top page, extra page, lower page, etc.) in a block configured in multi-bit-per-cell mode may also be capable of achieving different levels of performance relative to each other. It follows that a portion of data having a relatively high read and/or write heat associated therewith may desirably be destaged to one or more pages in blocks of memory which are configured in SLC mode. Alternatively, a portion of data having a relatively low read and/or write heat associated therewith may desirably be destaged to one or more pages in blocks of memory which are configured in multi-bit-per-cell mode. Further still, the different pages (e.g., top page, extra page, lower page, etc.) in a block configured in multi-bit-per-cell mode may also be capable of achieving different levels of performance relative to each other. It follows that the block and/or page(s) in a block which a portion of data is destaged to may be selected based on the current (e.g., updated) read and/or write heat information corresponding to the portion of data. However, it should be noted that the portion of data may be destaged in any desired manner.

In response to destaging the portion of data in operation 712, method 700 further includes updating the one or more bits in the hash table in the cache architecture which correspond to the portion of data to reflect the current read and/or write heat information associated with the portion of data. See operation 714. In other words, operation 714 includes updating the one or more bits in the hash table to reflect any updates to the read and/or write heat information for the portion of data that may have occurred while located in the cache. However, the process of updating the one or more bits to reflect the current read and/or write heat information may also be affected by where the portion of data is destaged to.

Again, blocks of memory which are configured in different modes have different performance characteristics associated therewith. Accordingly, some approaches may utilize the existing physical storage location (PBA) which maps to the LBA of a portion of data to augment read and/or write heat tracking granularity. In other words, for a multi-tier Flash storage system that separates data to different page types based on the read and/or write heat information associated therewith, the existing page type may be utilized to augment the read and/or write heat information of said data. According to an example which is in no way intended to limit the invention, a storage system has 4 different page types in addition to a 2 bit read heat counter at the logical page level. For this example, the resolution of the read heat information is effectively doubled, as there is a total of 8 different read heat levels which include 4 read heat levels based on the 2 bit counter, in addition to another 4 read heat levels based on the different possible page types.

Figure 7B:
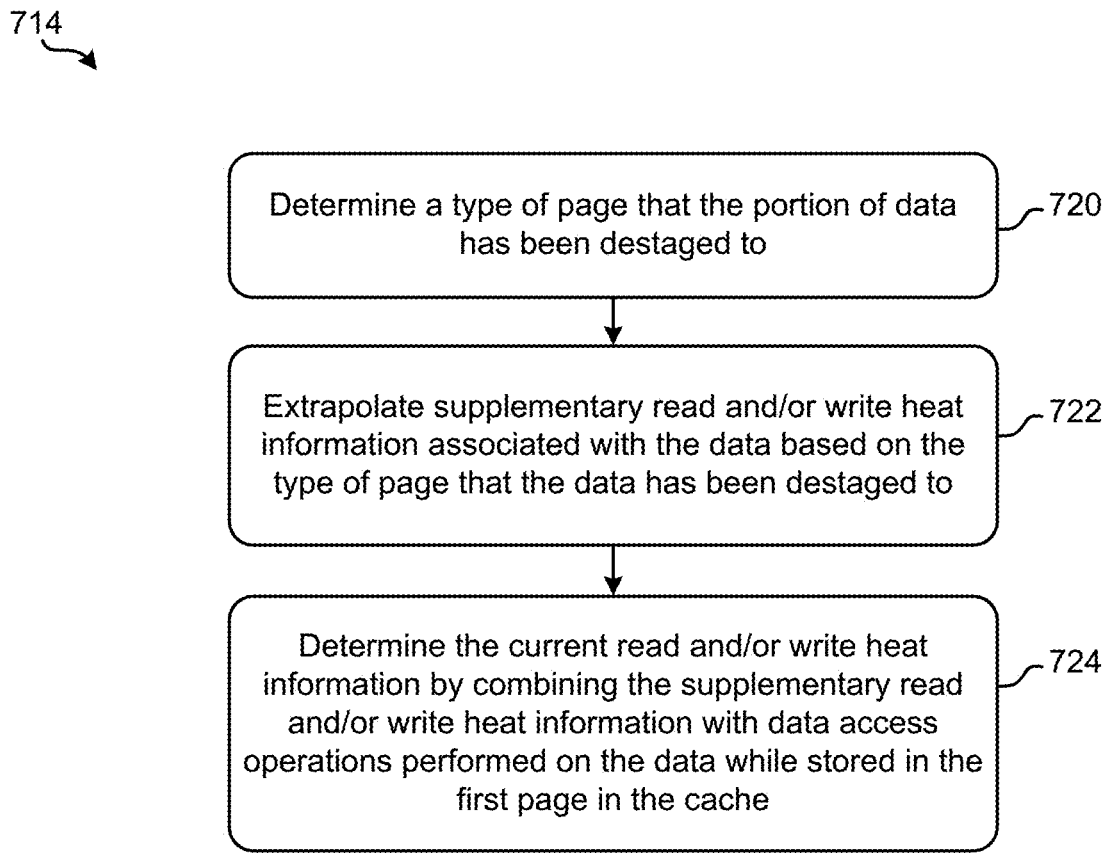
FIG. 7B is a flowchart of sub-processes for one of the operations in the method of FIG. 7A, in accordance with one embodiment.

It follows that the process of updating the one or more bits in the hash table to reflect the current read and/or write heat information associated with the portion of data as seen in operation 714 above may be achieved by performing a number of sub-processes. For instance, FIG. 7B includes a number of exemplary sub-processes for updating the one or more bits in the hash table to reflect the current read and/or write heat information associated with the portion of data in accordance with one embodiment. Any one or more of these sub-processes may be used to perform operation 714 of FIG. 7A. However, it should be noted that the sub-processes of FIG. 7B are illustrated in accordance with one embodiment which is in no way intended to limit the invention.

As shown, sub-operation 720 includes determining a type of page that the portion of data has been destaged to. In some approaches, sub-operation 720 may be performed by actually inspecting the physical configuration of the page(s) which the portion of data has been destaged to. In other approaches, sub-operation 720 may be performed by accessing a lookup table which maintains the current configuration mode of each page in the memory, or any other processes which would be apparent to one skilled in the art after reading the present description.

Sub-operation 722 further includes extrapolating supplementary read and/or write heat information associated with the data based on the type of page that the data has been destaged to. Once again, blocks of memory which are configured in different modes have different performance characteristics associated therewith. Accordingly, some approaches may utilize the existing physical storage location (PBA) which maps to the LBA of a portion of data to augment read and/or write heat tracking granularity. In other words, for a multi-tier Flash storage system that separates data to different page types based on the read and/or write heat information associated therewith, the existing page type may be utilized to augment the read and/or write heat information of said data.

This supplementary read and/or write heat information may thereby be used in the process of updating the one or more bits in the hash table to reflect the current read and/or write heat information associated with the portion of data. Accordingly, sub-operation 724 includes determining the current read and/or write heat information by combining the supplementary read and/or write heat information with data access operations performed on the data while stored in the first page in the cache. It should also be noted that other page information may also be used in the process of tracking read and/or write heat information. For example, the particular type of memory chip, storage tier, etc., in which a portion of data is stored may provide additional read and/or write heat information, e.g., as would be appreciated by one skilled in the art after reading the present description.

As mentioned above, the manner in which the read and/or write heat information of data is updated may vary depending on the given approach. For instance, while method 700 includes updating the read and/or write heat information once the portion of data has been destaged back to the main memory, FIG. 7C includes another method 750 for maintaining read and/or write heat information of data while in a cache according to another exemplary embodiment. The method 750 may be performed in accordance with the present invention in any of the environments depicted in FIGS. 1-6B, among others, in various embodiments. For instance, FIG. 7C includes variations of some of the processes included in the method 700 of FIG. 7A. Accordingly, some of the processes included in method 750 may implement any one or more of the approaches described above with respect to FIG. 7A. However, more or less operations than those specifically described in FIG. 7C may be included in method 750, as would be understood by one of skill in the art upon reading the present descriptions.

Each of the steps of the method 750 may be performed by any suitable component of the operating environment. For example, in various embodiments, the method 750 may be partially or entirely performed by a controller, a processor, a computer, etc., or some other device having one or more processors therein. Thus, in some embodiments, method 750 may be a computer-implemented method. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 750. Illustrative processors include, but are not limited to, a central processing unit (CPU), an application specific integrated circuit (ASIC), a field programmable gate array (FPGA), etc., combinations thereof, or any other suitable computing device known in the art.

Figure 7C:
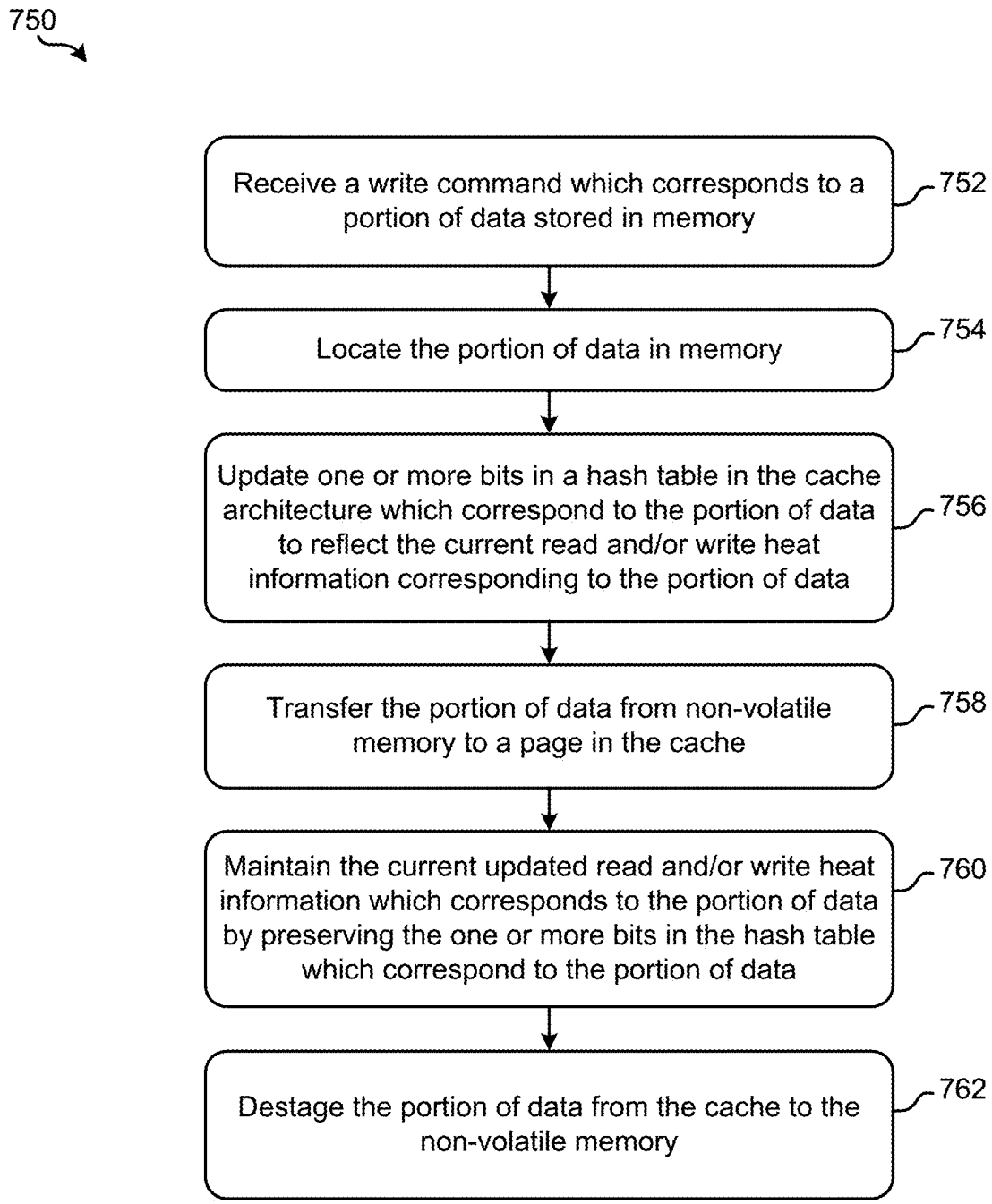
FIG. 7C is a flowchart of a method, in accordance with one embodiment.

As shown in FIG. 7C, operation 752 of method 750 includes receiving a write command which corresponds to a portion of data stored in memory. The write command may be an update which involves updating some or all of the portion of data specified therein. Accordingly, operation 754 includes locating the portion of data in memory. Operation 756 further includes updating one or more bits in a hash table in the cache architecture which correspond to the portion of data to reflect the current read and/or write heat information corresponding to the portion of data.

Again, because the write command received in operation 752 involves performing a write operation on the portion of data, it follows that at least the write heat associated therewith has increased (or will increase) as a result. Similarly, read operations received over time will increase the read heat associated with the portions of data which they correspond to. Updating the read and/or write heat corresponding to a portion of data before the data is even transferred to the cache and maintained while the data remains in the cache differs from the process described above in method 700, but achieves the same result of preserving an accurate representation of the read and/or write heat information which corresponds to various portions of data in memory. It follows that any one or more of the approaches described above may be implemented to perform operation 756.

Figure 7D:
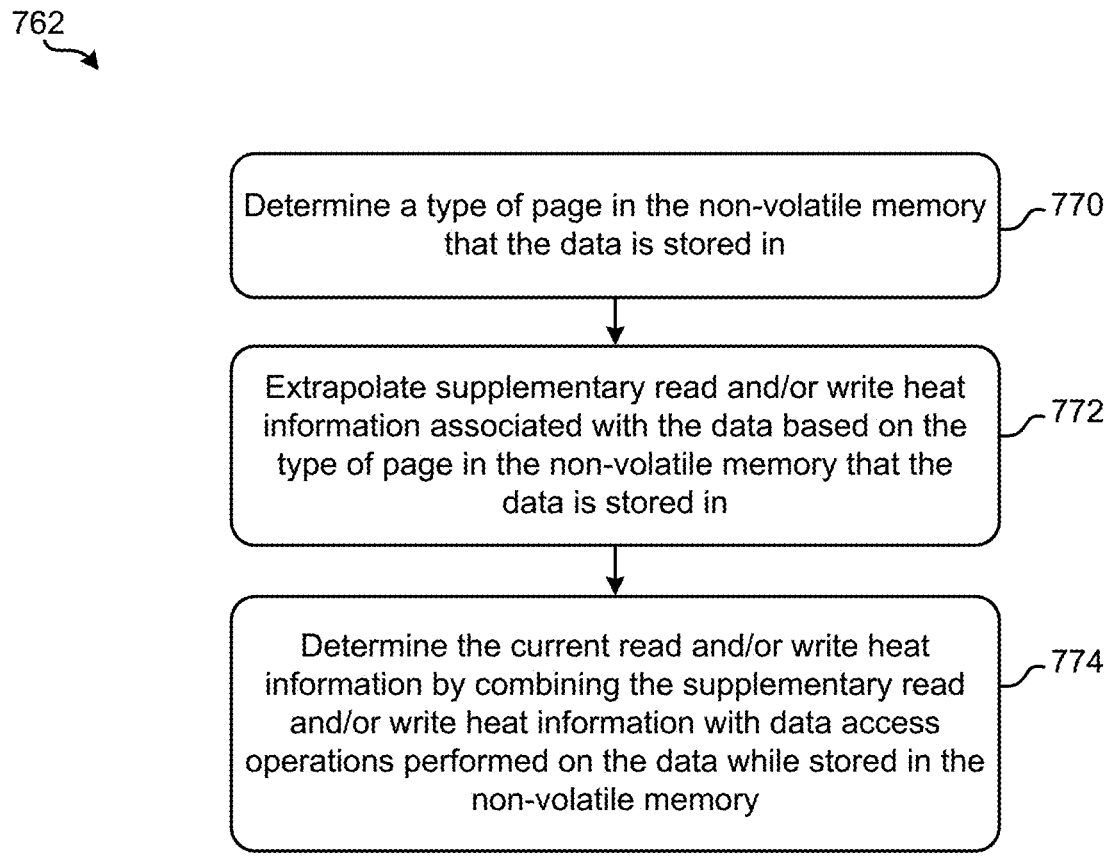
FIG. 7D is a flowchart of sub-processes for one of the operations in the method of FIG. 7C, in accordance with one embodiment.

Accordingly, the process of updating the one or more bits in the hash table to reflect the current read and/or write heat information associated with the portion of data as seen in operation 756 above may be achieved by performing a number of sub-processes. For instance, FIG. 7D includes a number of exemplary sub-processes for updating the one or more bits in the hash table to reflect the current read and/or write heat information associated with the portion of data in accordance with one embodiment. Any one or more of these sub-processes may be used to perform operation 756 of FIG. 7C. However, it should be noted that the sub-processes of FIG. 7D are illustrated in accordance with one embodiment which is in no way intended to limit the invention.

As shown, sub-operation 770 includes determining a type of page in the non-volatile memory that the data is stored in. Once again, the mode in which a block of memory is configured affects the performance characteristics of the given bloc. For example, a page in a block of memory that is configured in SLC mode is able to achieve faster read and/or write performance compared to a page in a block of memory that is configured in a multi-bit-per-cell mode. Further still, the different pages (e.g., top page, extra page, lower page, etc.) in a block configured in multi-bit-per-cell mode may also be capable of achieving different levels of performance relative to each other. It follows that a portion of data having a relatively high read and/or write heat associated therewith may desirably be stored in one or more pages in blocks of memory which are configured in SLC mode. Alternatively, a portion of data having a relatively low read and/or write heat associated therewith may desirably be stored in one or more pages in blocks of memory which are configured in multi-bit-per-cell mode.

In some approaches, sub-operation 770 may be performed by actually inspecting the physical configuration of the page(s) which the portion of data is stored in. In other approaches, sub-operation 770 may be performed by accessing a lookup table which maintains the current configuration mode of each page in the memory, or any other processes which would be apparent to one skilled in the art after reading the present description. It should also be noted that other page information may also be used in the process of tracking read and/or write heat information. For example, the particular type of memory chip, storage tier, etc., in which a portion of data is stored may provide additional read and/or write heat information, e.g., as would be appreciated by one skilled in the art after reading the present description.

Sub-operation 772 further includes extrapolating supplementary read and/or write heat information associated with the data based on the type of page in the non-volatile memory that the data is stored in. This supplementary read and/or write heat information may thereby be used in the process of updating the one or more bits in the hash table to reflect the current read and/or write heat information associated with the portion of data. Accordingly, sub-operation 774 includes determining the current read and/or write heat information by combining the supplementary read and/or write heat information with data access operations performed on the data while stored in the non-volatile memory.

Returning to FIG. 7C, operation 758 includes transferring the portion of data from non-volatile memory (e.g., NAND Flash) to a page in the cache. Moreover, operation 760 includes maintaining the current updated read and/or write heat information which corresponds to the portion of data by preserving the one or more bits in the hash table which correspond to the portion of data. As a result, the updated read and/or write heat information which corresponds to the portion of data is available while the portion of data remains in the cache and even at the point in time that the data is destaged from the cache.

Accordingly, operation 762 includes destaging the portion of data from the first page in the cache to the non-volatile memory. As mentioned above, data may be destaged from the cache according to any desired replacement policies. Accordingly, in some approaches the portion of data is destaged from the cache in response to being replaced by other data that has been written more recently.

It follows that various ones of the embodiments included herein are able to perform heat tracking in memory which implements a cache architecture. Some of the embodiments included herein augment the controller architecture with metadata to track read and/or write heat information. For instance, upon a page of data entering the cache, the controller may preserve and/or update the read and/or write heat information which corresponds to the given page, e.g., according to any of the approaches described herein. Moreover, in response to destaging the given page evicted from the cache, the controller may to preserve and/or update the read and/or write heat information which corresponds to the given page, e.g., according to any of the approaches described herein.

Some of the embodiments included herein are also able to increase the resolution of read and/or write heat information by utilizing the physical location that data is stored. This increased heat information resolution significantly increases performance of the overarching system without introducing any additional metadata to the memory. Moreover, while newly written data may not have any read and/or write heat information corresponding thereto upon being stored in memory, any of the approaches included herein may be applied to accumulate read and/or write heat information over the lifetime of the data, and assist in selecting the preferred storage location for the data while improving performance of the system overall.

As alluded to above, the manner in which a data access request is satisfied by a memory module having a write cache differs depending on the particular approach. For instance, looking to FIGS. 8A-8B, two different methods 800, 850 of performing a data access operation are illustrated according to two different embodiments. Either of the methods 800, 850 may be performed in accordance with the present invention in any of the environments depicted in FIGS. 1-7D, among others, in various embodiments. Of course, more or less operations than those specifically described in FIGS. 8A-8B may be included in methods 800, 850, as would be understood by one of skill in the art upon reading the present descriptions.

Each of the steps of either of the methods 800, 850 may be performed by any suitable component of the operating environment. For example, in various embodiments, method 800 and/or method 850 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the methods 800, 850. Illustrative processors include, but are not limited to, a central processing unit (CPU), an application specific integrated circuit (ASIC), a field programmable gate array (FPGA), etc., combinations thereof, or any other suitable computing device known in the art.

Figure 8A:
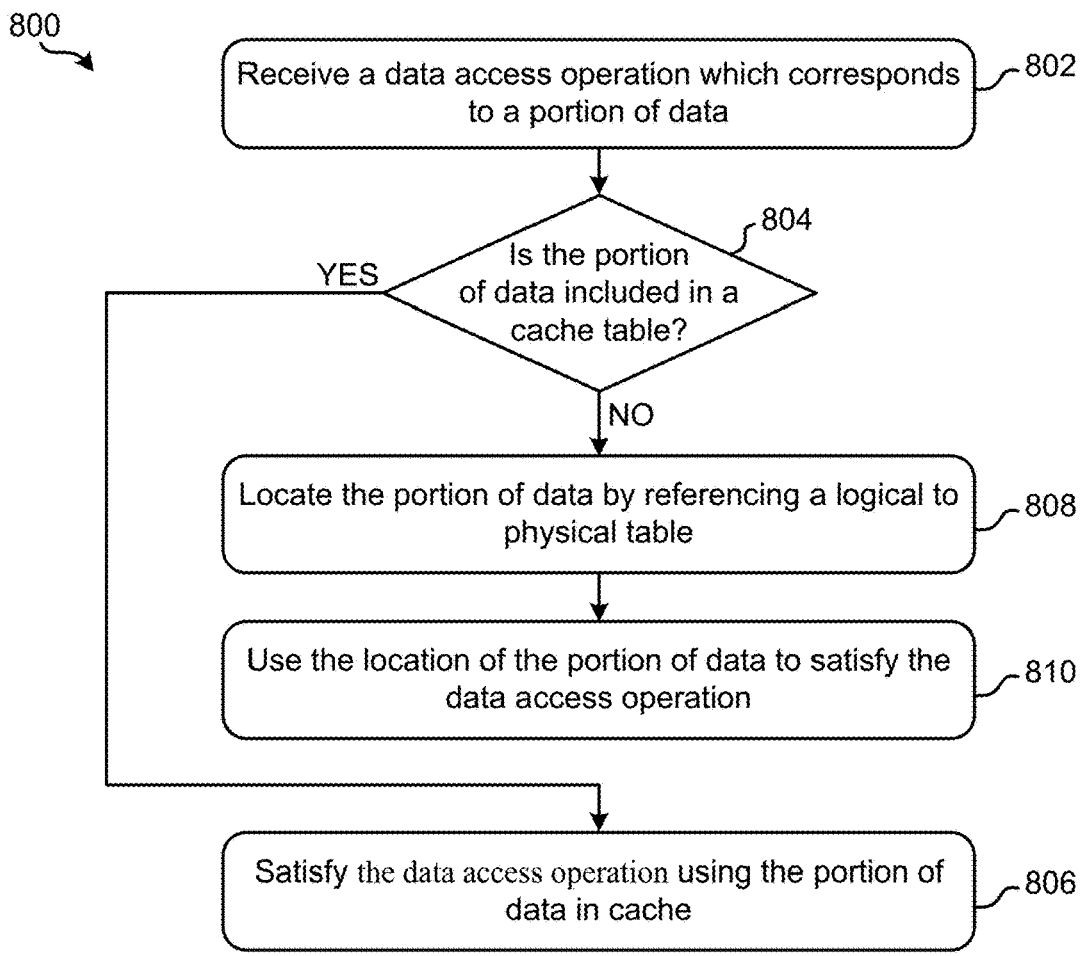
FIG. 8A is a flowchart of a method, in accordance with one embodiment.

Referring specifically to FIG. 8A, method 800 corresponds to an approach which maintains a cache mapping table that maps LBAs to cached pages within cache entries. Accordingly, operation 802 includes receiving a data access operation which corresponds to a portion of data. Decision 804 includes determining whether the portion of data is included in a cache table. Again, method 800 corresponds to an approach in which the cache table maps LBAs to pages of data in the cache. Accordingly, the cache table is able to identify the data that is currently stored in the cache.

In response to determining that the portion of data is included in the cache table, method 800 proceeds to operation 806 which includes satisfying the data access operation using the portion of data in cache. However, in response to determining that the portion of data is not included in the cache table, method 800 proceeds to operation 808. There, operation 808 includes locating the portion of data by referencing a logical to physical table. Moreover, operation 810 includes using the location of the portion of data to satisfy the data access operation.

It follows that the process of accessing a LBA as described in method 800 involves first looking to the cache table for the LBA, and falling back to the LPT table if cache lookup results in a miss. However, in other approaches, performing data access operations using the cache is achieved by directly incorporating the cached page locations in an existing LPT, e.g., as illustrated in method 850 of FIG. 8B.

Figure 8B:
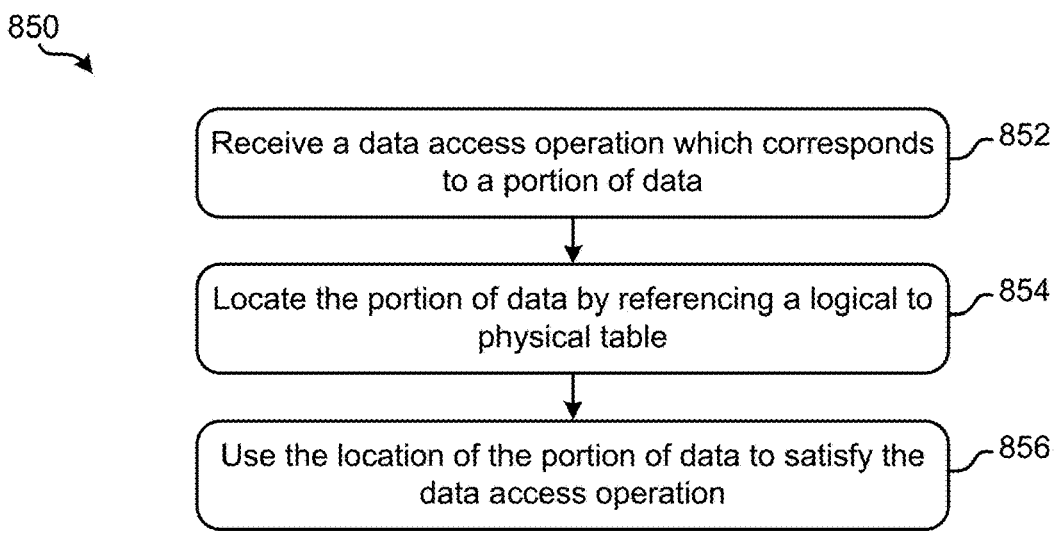
FIG. 8B is a flowchart of a method, in accordance with one embodiment.

Looking now to FIG. 8B, operation 852 includes receiving a data access operation which corresponds to a portion of data. Moreover, operation 854 includes locating the portion of data by referencing a logical to physical table. As noted above, the logical to physical table incorporates data storage location information corresponding to data included in the cache. Accordingly, by locating the portion of data by referencing a logical to physical table, the location of the portion of data may be further used to satisfy the data access operation. See operation 856.

Again, some of the embodiments included herein are able to preserve read and/or write heat information in the controller architecture, even while the data is in cache. Some of the embodiments included herein are also able to increase the resolution of read and/or write heat information by utilizing the physical location that data is stored. Moreover, some of the embodiments included herein are able to achieve higher resolution (e.g., granularity) of read and/or write heat tracking in comparison to conventional implementations. This increased resolution is also achieved without introducing any additional overheat in terms of metadata memory, thereby significantly increasing efficiency.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Figure 9:
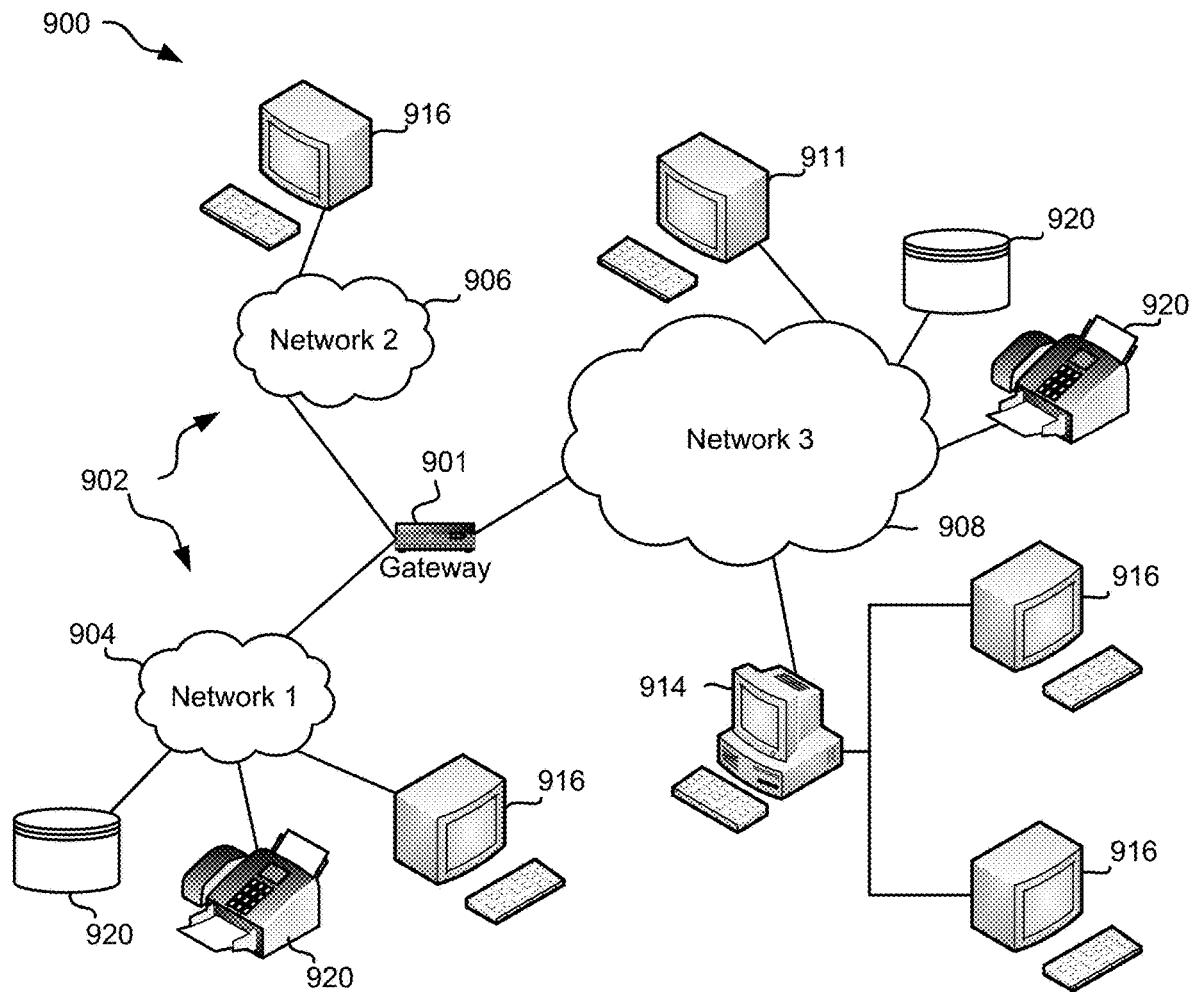
FIG. 9 is a network architecture, in accordance with one embodiment.

FIG. 9 illustrates a network architecture 900, in accordance with one embodiment. As shown in FIG. 9, a plurality of remote networks 902 are provided including a first remote network 904 and a second remote network 906. A gateway 901 may be coupled between the remote networks 902 and a proximate network 908. In the context of the present network architecture 900, the networks 904, 906 may each take any form including, but not limited to a LAN, a WAN such as the Internet, public switched telephone network (PSTN), internal telephone network, etc.

In use, the gateway 901 serves as an entrance point from the remote networks 902 to the proximate network 908. As such, the gateway 901 may function as a router, which is capable of directing a given packet of data that arrives at the gateway 901, and a switch, which furnishes the actual path in and out of the gateway 901 for a given packet.

Further included is at least one data server 914 coupled to the proximate network 908, and which is accessible from the remote networks 902 via the gateway 901. It should be noted that the data server(s) 914 may include any type of computing device/groupware. Coupled to each data server 914 is a plurality of user devices 916. Such user devices 916 may include a desktop computer, laptop computer, handheld computer, printer, and/or any other type of logic-containing device. It should be noted that a user device 911 may also be directly coupled to any of the networks, in some embodiments.

A peripheral 920 or series of peripherals 920, e.g., facsimile machines, printers, scanners, hard disk drives, networked and/or local data storage units or systems, etc., may be coupled to one or more of the networks 904, 906, 908. It should be noted that databases and/or additional components may be utilized with, or integrated into, any type of network element coupled to the networks 904, 906, 908. In the context of the present description, a network element may refer to any component of a network.

According to some embodiments, methods and systems described herein may be implemented with and/or on virtual systems and/or systems which emulate one or more other systems, such as a UNIX system which virtually hosts a MICROSOFT WINDOWS environment, etc. This virtualization and/or emulation may be enhanced through the use of VMWARE software, in some embodiments.

In other embodiments, one or more networks 904, 906, 908, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 10:
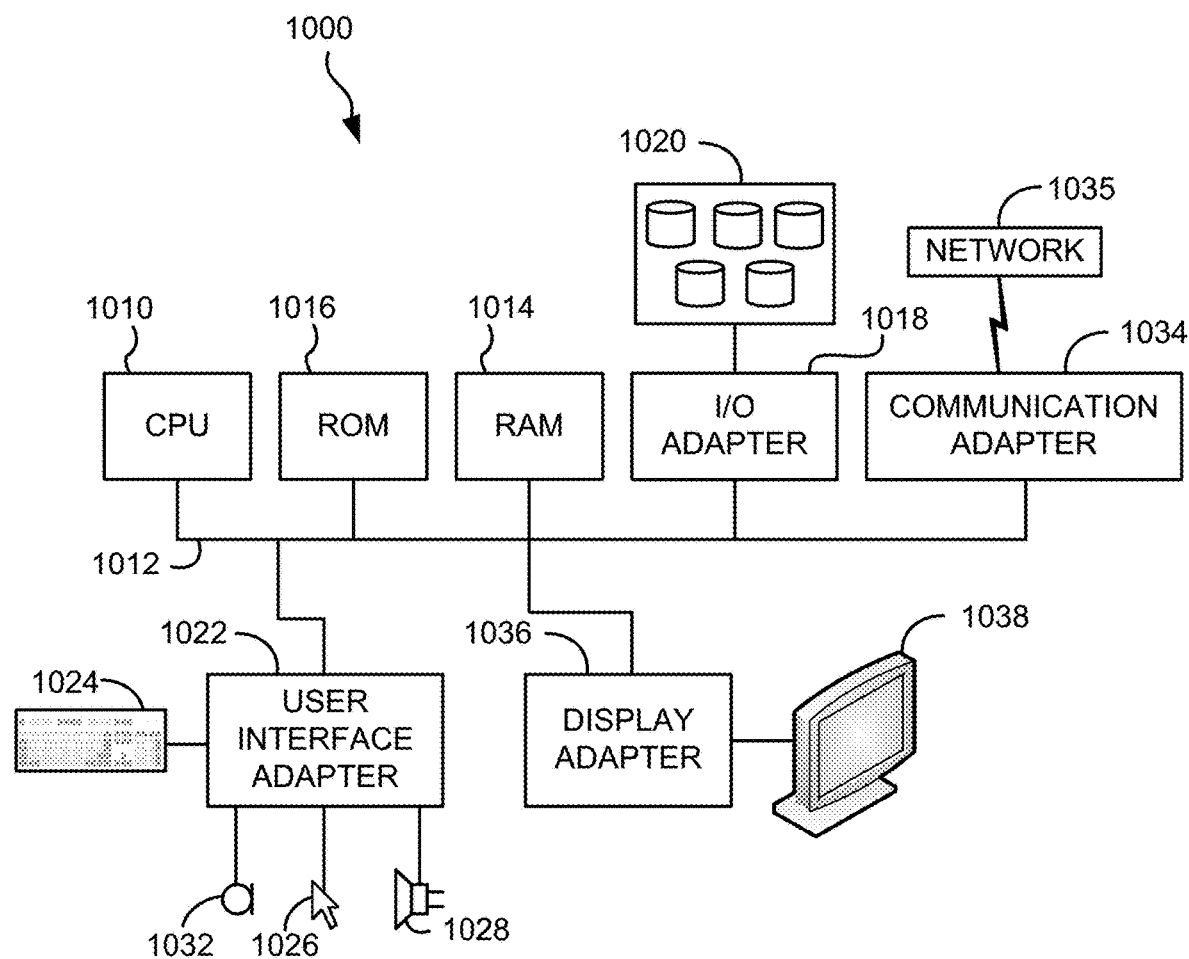
FIG. 10 is a representative hardware environment that may be associated with the servers and/or clients of FIG. 9, in accordance with one embodiment.

FIG. 10 shows a representative hardware environment associated with a user device 916 and/or server 914 of FIG. 9, in accordance with one embodiment. FIG. 10 illustrates a typical hardware configuration of a processor system 1000 having a central processing unit 1010, such as a microprocessor, and a number of other units interconnected via a system bus 1012, according to one embodiment. In some embodiments, central processing unit 1010 may include any of the approaches described above with reference to the one or more processors 210 of FIG. 2.

The processor system 1000 shown in FIG. 10 includes a Random Access Memory (RAM) 1014, Read Only Memory (ROM) 1016, and an I/O adapter 1018. According to some embodiments, which are in no way intended to limit the invention, I/O adapter 1018 may include any of the approaches described above with reference to I/O adapter 218 of FIG. 2. Referring still to processor system 1000 of FIG. 10, the aforementioned components 1014, 1016, 1018 may be used for connecting peripheral devices such as storage subsystem 1020 to the bus 1012. In some embodiments, storage subsystem 1020 may include a similar and/or the same configuration as data storage system 220 of FIG. 2. According to an example, which is in no way intended to limit the invention, storage subsystem 1020 may include non-volatile data storage cards, e.g., having NVRAM memory cards, RAM, ROM, and/or some other known type of non-volatile memory, in addition to RAID controllers as illustrated in FIG. 2.

With continued reference to FIG. 10, a user interface adapter 1022 for connecting a keyboard 1024, a mouse 1026, a speaker 1028, a microphone 1032, and/or other user interface devices such as a touch screen, a digital camera (not shown), etc., to the bus 1012.

Processor system 1000 further includes a communication adapter 1034 which connects the processor system 1000 to a communication network 1035 (e.g., a data processing network) and a display adapter 1036 which connects the bus 1012 to a display device 1038.

The processor system 1000 may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 11:
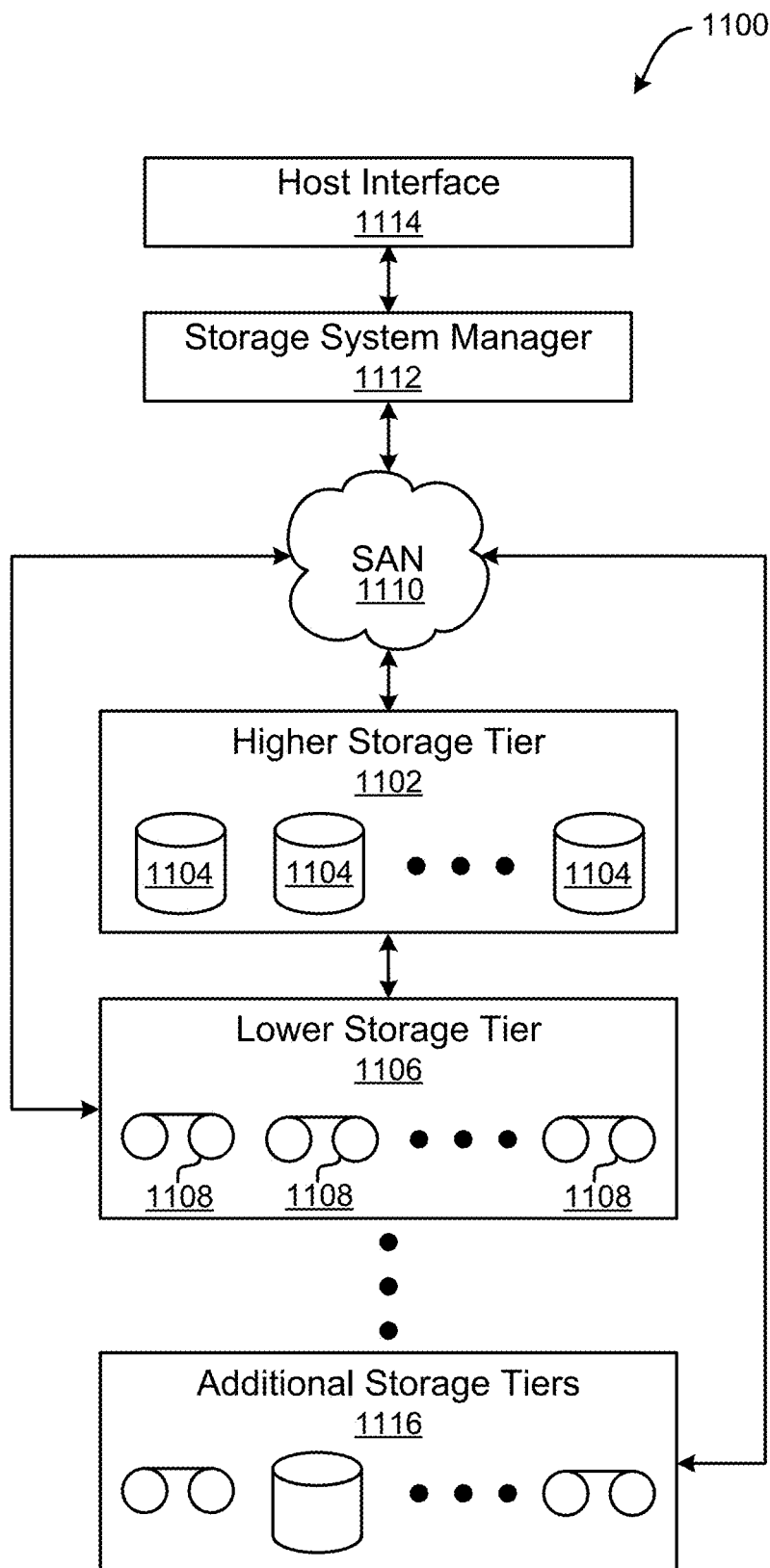
FIG. 11 is a tiered data storage system in accordance with one embodiment.

Moreover, FIG. 11 illustrates a storage system 1100 which implements high level (e.g., SSD) storage tiers in combination with lower level (e.g., magnetic tape) storage tiers, according to one embodiment. Note that some of the elements shown in FIG. 11 may be implemented as hardware and/or software, according to various embodiments. The storage system 1100 may include a storage system manager 1112 for communicating with a plurality of media on at least one higher storage tier 1102 and at least one lower storage tier 1106. However, in other approaches, a storage system manager 1112 may communicate with a plurality of media on at least one higher storage tier 1102, but no lower storage tier. The higher storage tier(s) 1102 preferably may include one or more random access and/or direct access media 1104, such as hard disks, nonvolatile memory (NVM), NVRAM), solid state memory in SSDs, flash memory, SSD arrays, flash memory arrays, etc., and/or others noted herein or known in the art. According to illustrative examples, FIGS. 3-4 show exemplary architectures of SSD systems which may be used as a higher storage tier 1102 depending on the desired embodiment.

Referring still to FIG. 11, the lower storage tier(s) 1106 preferably includes one or more lower performing storage media 1108, including sequential access media such as magnetic tape in tape drives and/or optical media, slower accessing HDDs, slower accessing SSDs, etc., and/or others noted herein or known in the art. One or more additional storage tiers 1116 may include any combination of storage memory media as desired by a designer of the system 1100. Thus the one or more additional storage tiers 1116 may, in some approaches, include a SSD system architecture similar or the same as those illustrated in FIGS. 1-2. Also, any of the higher storage tiers 1102 and/or the lower storage tiers 1106 may include any combination of storage devices and/or storage media.

The storage system manager 1112 may communicate with the storage media 1104, 1108 on the higher storage tier(s) 1102 and lower storage tier(s) 1106 through a network 1110, such as a storage area network (SAN), as shown in FIG. 11, or some other suitable network type. The storage system manager 1112 may also communicate with one or more host systems (not shown) through a host interface 1114, which may or may not be a part of the storage system manager 1112. The storage system manager 1112 and/or any other component of the storage system 1100 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 1100 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 1102, may include a majority of SSD storage media for storing data in a higher performing storage environment, and remaining storage tiers, including lower storage tier 1106 and additional storage tiers 1116 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 1102, while data not having one of these attributes may be stored to the additional storage tiers 1116, including lower storage tier 1106. Of course, one of skill in the art, upon reading the present descriptions, may devise many other combinations of storage media types to implement into different storage schemes, according to the embodiments presented herein.

According to some embodiments, the storage system (such as 1100) may include logic configured to receive a request to open a data set, logic configured to determine if the requested data set is stored to a lower storage tier 1106 of a tiered data storage system 1100 in multiple associated portions, logic configured to move each associated portion of the requested data set to a higher storage tier 1102 of the tiered data storage system 1100, and logic configured to assemble the requested data set on the higher storage tier 1102 of the tiered data storage system 1100 from the associated portions.

Of course, this logic may be implemented as a method on any device and/or system or as a computer program product, according to various embodiments.

It will be clear that the various features of the foregoing systems and/or methodologies may be combined in any way, creating a plurality of combinations from the descriptions presented above.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for maintaining heat information of data while in a cache, comprising:
   transferring data from non-volatile memory to the cache, wherein the data is stored in a first page in the cache;
   maintaining previous read and/or write heat information associated with the data by preserving one or more bits in a hash table which correspond to the data in the first page;
   destaging the data from the first page in the cache to the non-volatile memory; and
   updating the one or more bits in the hash table which correspond to the data to reflect current read and/or write heat information associated with the data.

2. The computer-implemented method of claim 1, wherein updating the one or more bits in the hash table which correspond to the data to reflect current read and/or write heat information associated with the data includes:
   determining a type of page that the data has been destaged to;
   extrapolating supplementary read and/or write heat information associated with the data based on the type of page that the data has been destaged to; and
   determining the current read and/or write heat information by combining the supplementary read and/or write heat information with data access operations performed on the data while stored in the first page in the cache.

3. The computer-implemented method of claim 1, comprising:
   receiving a data access operation which corresponds to a portion of data;
   determining whether the portion of data is included in a cache table, wherein the cache table maps logical block addresses to pages of data in the cache;
   in response to determining that the portion of data is not included in the cache table, locating the portion of data by referencing a logical to physical table; and
   using the location of the portion of data to satisfy the data access operation.

4. The computer-implemented method of claim 1, comprising:
   receiving a data access operation which corresponds to a portion of data;
   locating the portion of data by referencing a logical to physical table, wherein the logical to physical table incorporates location information corresponding to data included in the cache; and
   using the location of the portion of data to satisfy the data access operation.

5. The computer-implemented method of claim 1, wherein the heat information includes read heat information.

6. The computer-implemented method of claim 1, wherein the heat information includes write heat information.

7. The computer-implemented method of claim 1, wherein the heat information includes read heat information and write heat information.

8. The computer-implemented method of claim 1, wherein the non-volatile memory is NAND Flash memory.

9. A computer-implemented method for maintaining heat information of data while in a cache, comprising:
   updating one or more bits in a hash table which correspond to data to reflect current read and/or write heat information corresponding to the data;
   transferring the data from non-volatile memory to the cache, wherein the data is stored in a first page in the cache;
   maintaining the current read and/or write heat information which corresponds to the data by preserving the one or more bits in the hash table which correspond to the data; and
   destaging the data from the first page in the cache to the non-volatile memory.

10. The computer-implemented method of claim 9, wherein updating the one or more bits in the hash table which correspond to the data to reflect the current read and/or write heat information corresponding to the data includes:
    determining a type of page in the non-volatile memory that the data is stored in;
    extrapolating supplementary read and/or write heat information associated with the data based on the type of page in the non-volatile memory that the data is stored in; and
    determining the current read and/or write heat information by combining the supplementary read and/or write heat information with data access operations that have been performed on the data while stored in the non-volatile memory.

11. The computer-implemented method of claim 9, comprising:
    receiving a data access operation which corresponds to a portion of data;
    determining whether the portion of data is included in a cache table, wherein the cache table maps logical block addresses to pages of data in the cache;
    in response to determining that the portion of data is not included in the cache table, locating the portion of data by referencing a logical to physical table; and
    using the location of the portion of data to satisfy the data access operation.

12. The computer-implemented method of claim 9, comprising:
    receiving a data access operation which corresponds to a portion of data;
    locating the portion of data by referencing a logical to physical table, wherein the logical to physical table incorporates location information corresponding to data included in the cache; and
    using the location of the portion of data to satisfy the data access operation.

13. The computer-implemented method of claim 9, wherein the heat information includes read heat information.

14. The computer-implemented method of claim 9, wherein the heat information includes write heat information.

15. The computer-implemented method of claim 9, wherein the heat information includes read heat information and write heat information.

16. The computer-implemented method of claim 9, wherein the non-volatile memory is NAND Flash memory.

17. A computer program product comprising a computer readable storage medium having program instructions embodied therewith, the program instructions readable and/or executable by a processor to cause the processor to:

transfer, by the processor, data from non-volatile memory to a cache, wherein the data is stored in a first page in the cache;

maintain, by the processor, previous read and/or write heat information associated with the data by preserving one or more bits in a hash table which correspond to the data in the first page;

destage, by the processor, the data from the first page in the cache to the non-volatile memory; and update, by the processor, the one or more bits in the hash table which correspond to the data to reflect current read and/or write heat information associated with the data.

18. The computer program product of claim 17, wherein updating the one or more bits in the hash table which correspond to the data to reflect current read and/or write heat information associated with the data includes:

determining a type of page that the data has been destaged to;

extrapolating supplementary read and/or write heat information associated with the data based on the type of page that the data has been destaged to; and determining the current read and/or write heat information by combining the supplementary read and/or write heat information with data access operations performed on the data while stored in the first page in the cache.

19. The computer program product of claim 17, wherein the program instructions are readable and/or executable by a processor to cause the processor to:

receive, by the processor, a data access operation which corresponds to a portion of data;

determine, by the processor, whether the portion of data is included in a cache table, wherein the cache table maps logical block addresses to pages of data in the cache;

in response to determining that the portion of data is not included in the cache table, locate, by the processor, the portion of data by referencing a logical to physical table; and use, by the processor, the location of the portion of data to satisfy the data access operation.

20. The computer program product of claim 17, wherein the program instructions are readable and/or executable by a processor to cause the processor to:

receive, by the processor, a data access operation which corresponds to a portion of data;

locate, by the processor, the portion of data by referencing a logical to physical table, wherein the logical to physical table incorporates location information corresponding to data included in the cache; and use, by the processor, the location of the portion of data to satisfy the data access operation.

* * * * *